United States Patent
Colombo et al.

(10) Patent No.: US 7,081,808 B2
(45) Date of Patent: Jul. 25, 2006

(54) SELF-REGISTRATION SYSTEMS AND METHODS FOR DYNAMICALLY UPDATING INFORMATION RELATED TO A NETWORK

(75) Inventors: Bruce A. Colombo, Pompton Plains, NJ (US); Clay A. Feustel, Lawrenceville, GA (US); Mark R. Jennings, Andover, NJ (US); Sean L. Jones, Clarkston, GA (US); Norman R. Lampert, Norcross, GA (US); Frank S. Leone, Berkeley Heights, NJ (US); Francis G. McCormack, Cumming, GA (US); Gregory A. Sandels, Buford, GA (US); Naif T. Subh, Lawrenceville, GA (US); Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 666 days.

(21) Appl. No.: 10/243,438

(22) Filed: Sep. 13, 2002

(65) Prior Publication Data

US 2004/0054761 A1    Mar. 18, 2004

(51) Int. Cl.
*G08B 1/00* (2006.01)
(52) U.S. Cl. .......................... 340/310.01; 340/310.06; 340/539.19; 340/651; 385/134; 385/147
(58) Field of Classification Search .......... 340/310.01, 340/310.06, 532, 533, 538, 539.1, 539.19, 340/545.6, 569, 570, 651, 310.1; 385/134, 385/135, 136, 137, 139, 147; 455/435.1, 455/417, 432.3; 324/66, 67; 439/457
See application file for complete search history.

(56) References Cited

U.S. PATENT DOCUMENTS

| | | | | |
|---|---|---|---|---|
| 4,470,784 | A | | 9/1984 | Piotrovsky .................. 425/116 |
| 4,900,124 | A | | 2/1990 | Lampert et al. ......... 350/96.21 |
| 5,394,503 | A | * | 2/1995 | Dietz et al. ................. 385/135 |
| 5,420,512 | A | | 5/1995 | Spillane et al. ............. 324/539 |
| 5,448,675 | A | * | 9/1995 | Leone et al. ................ 385/135 |

(Continued)

FOREIGN PATENT DOCUMENTS

EP    1026916 A2    9/2000

OTHER PUBLICATIONS

Foreign Search Report dated Dec. 16, 2003.

*Primary Examiner*—Jeffery Hofsass
*Assistant Examiner*—Daniel Previl
(74) *Attorney, Agent, or Firm*—Thomas, Kayden, Horstemeyer & Risley, LLP

(57) ABSTRACT

Self-registration systems and methods for dynamically updating information related to a network, are provided. A self-registration system for dynamically updating information related to a network, comprises: a connector comprising an integrated circuit that stores a first block of information; an adapter coupled to the connector; a reader that receives the first block of information from the integrated circuit via the adapter; and a communication line coupled to the adapter via the connector, where the first block of information comprises a first block of information about network elements associated with the integrated circuit, and where the first block of information about network elements associated with the integrated circuit comprises information other than information identifying the connector, the adapter, the communication line and the integrated circuit.

34 Claims, 18 Drawing Sheets

U.S. PATENT DOCUMENTS

| | | | |
|---|---|---|---|
| 5,461,693 A | * 10/1995 | Pimpinella | 385/135 |
| 5,463,706 A | 10/1995 | Dumont et al. | 385/32 |
| 5,606,664 A | 2/1997 | Brown et al. | 395/200.1 |
| 5,615,344 A | 3/1997 | Corder | 395/309 |
| 5,666,453 A | 9/1997 | Dannenmann | 385/101 |
| 6,002,331 A | * 12/1999 | Laor | 340/539.1 |
| 6,115,774 A | 9/2000 | Ezawa et al. | 710/131 |
| 6,351,819 B1 | * 2/2002 | Berglund et al. | 713/310 |

* cited by examiner

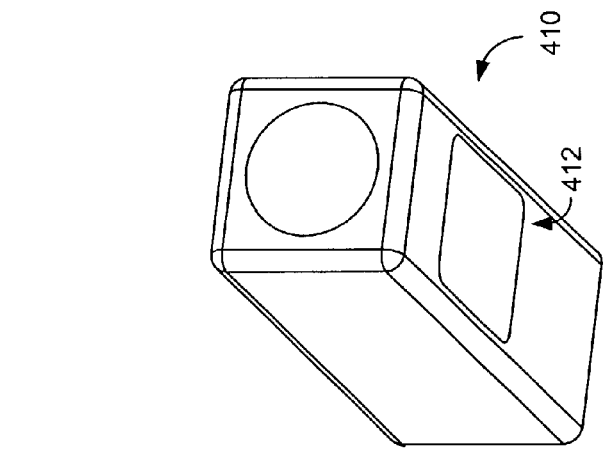
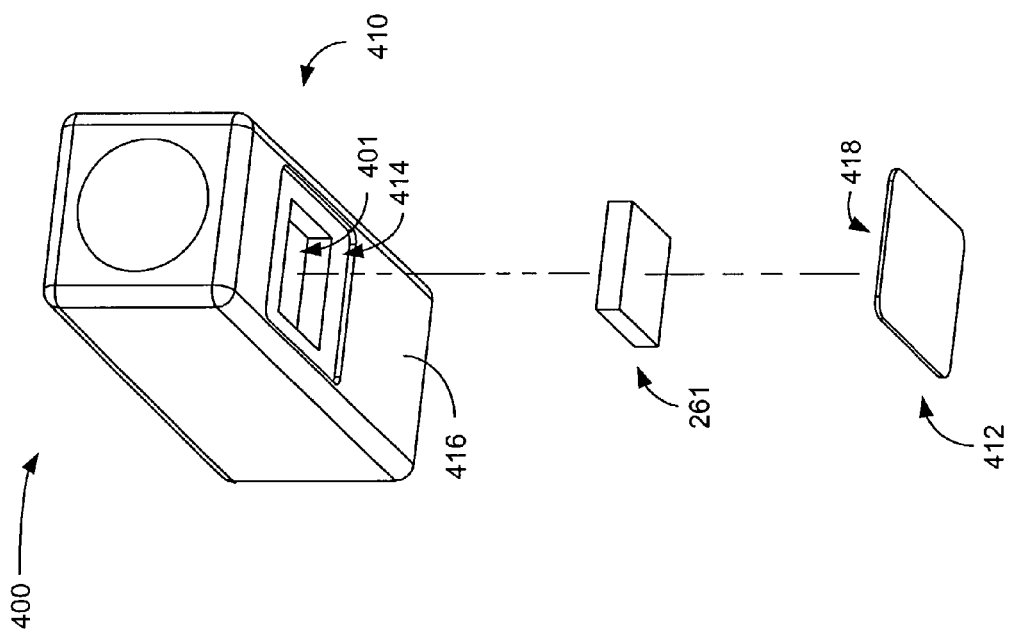

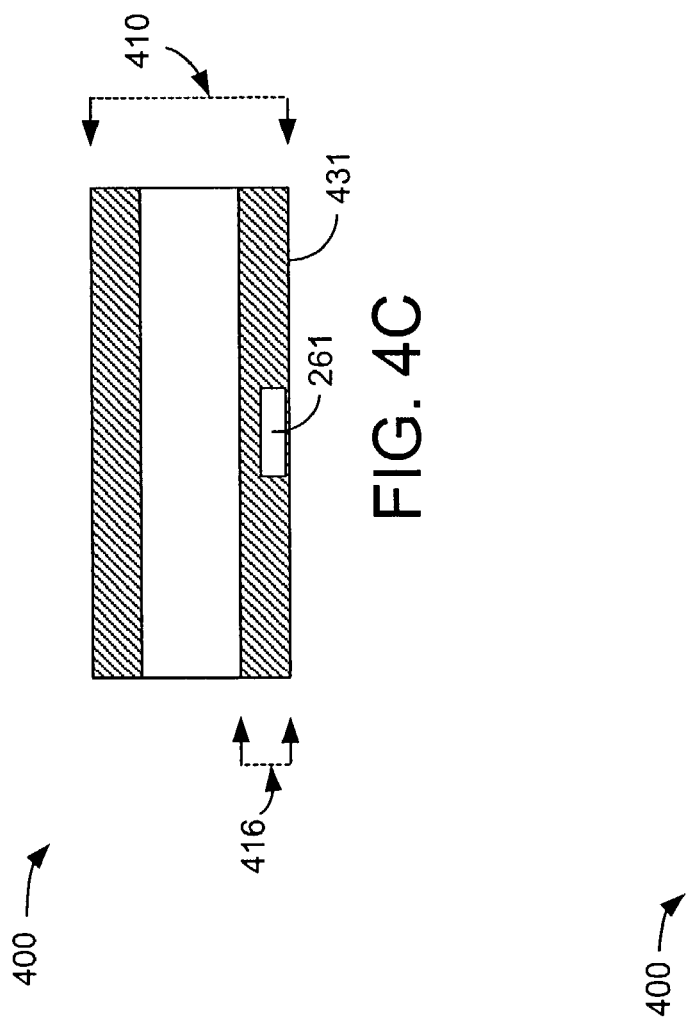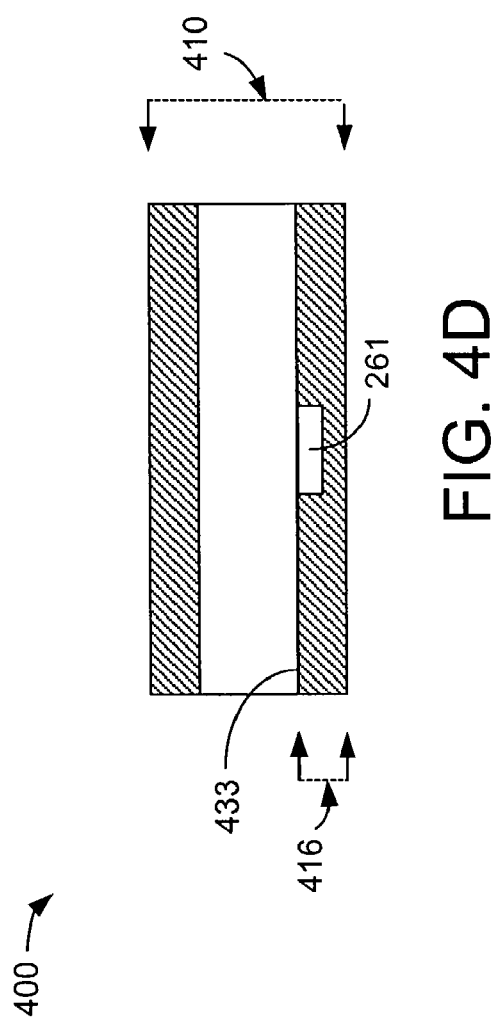

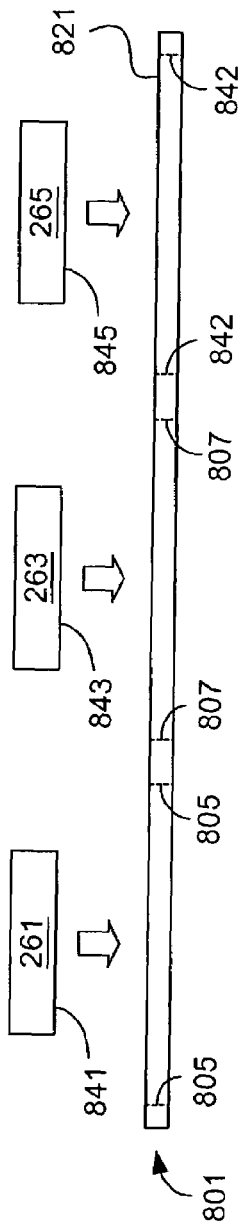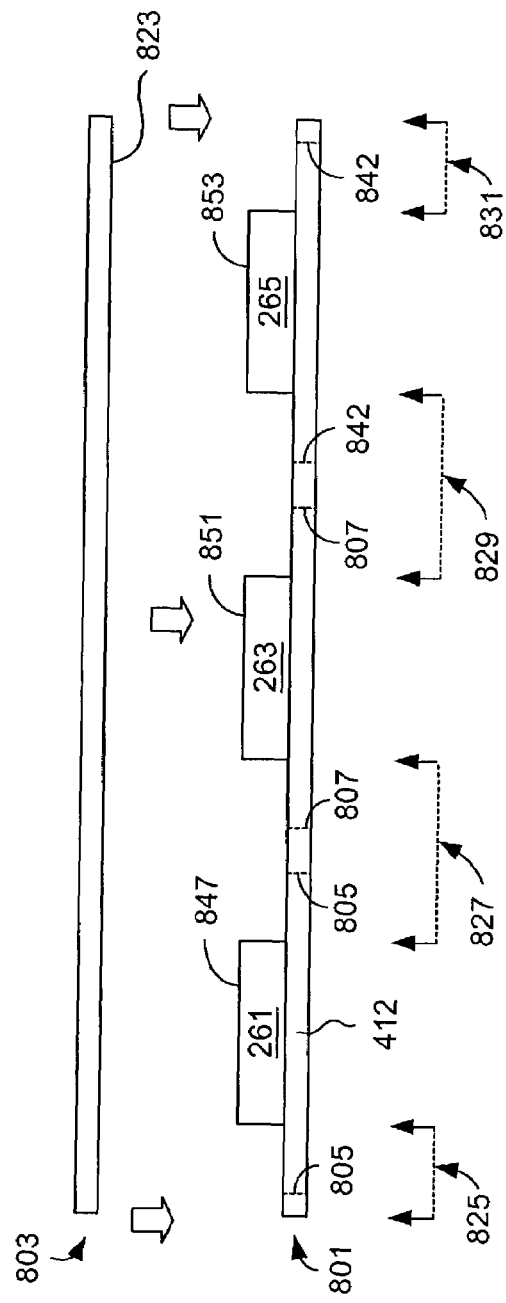
FIG. 8A
FIG. 8B

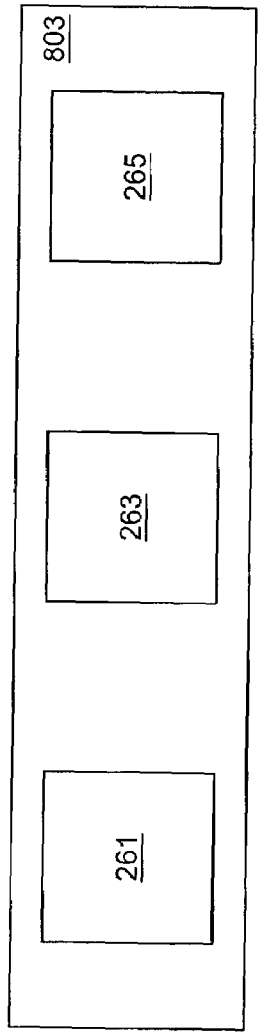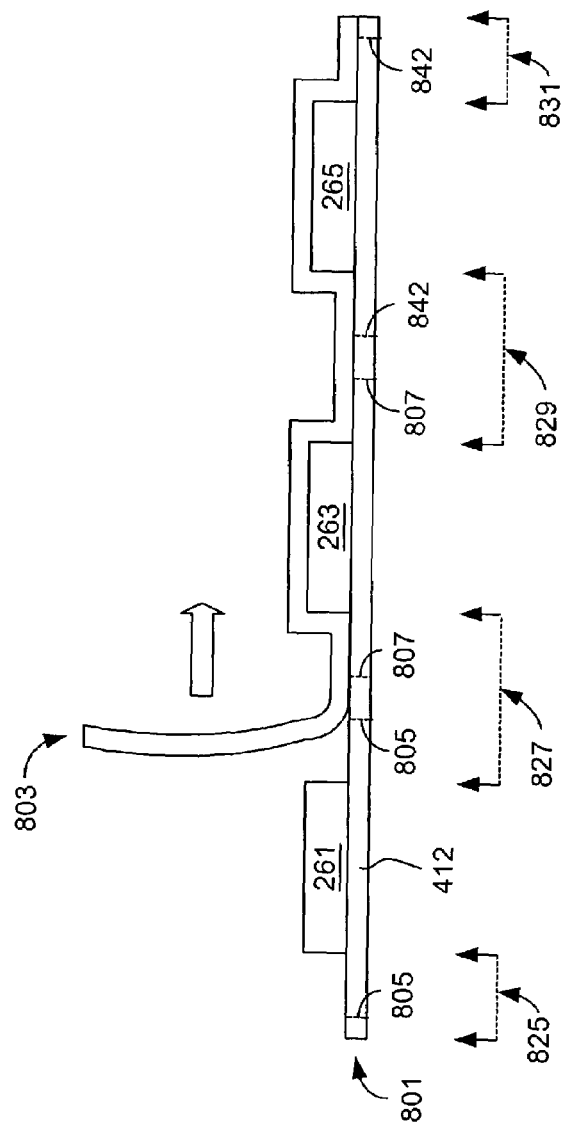

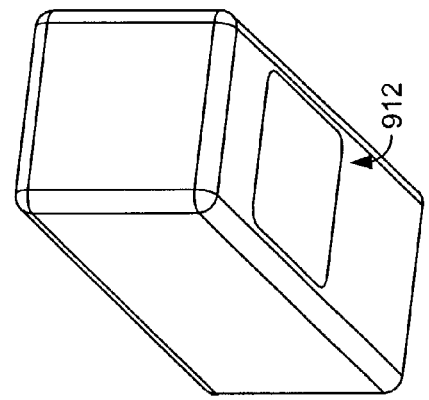
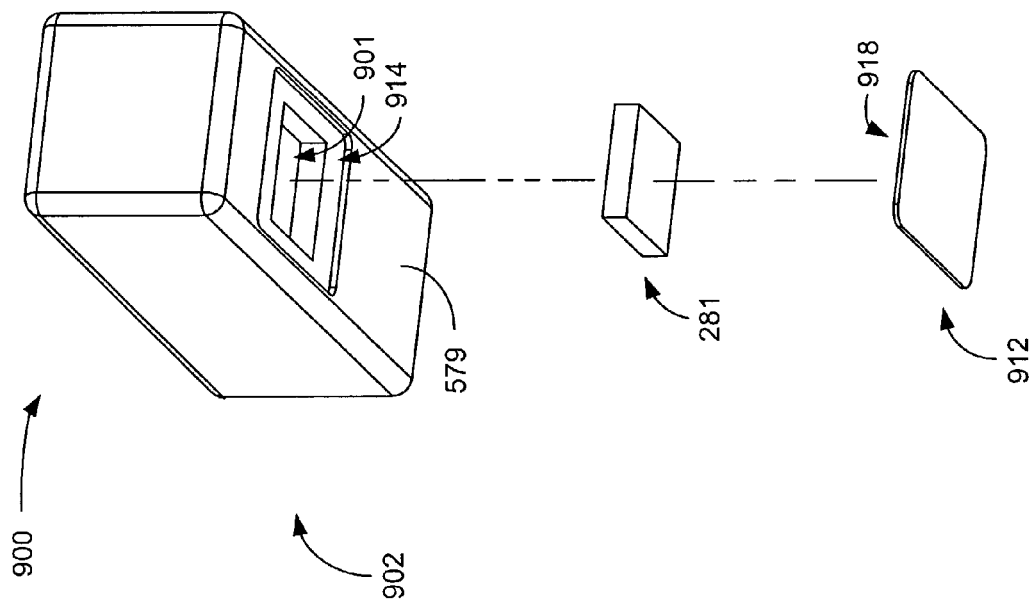
FIG. 9B
FIG. 9A

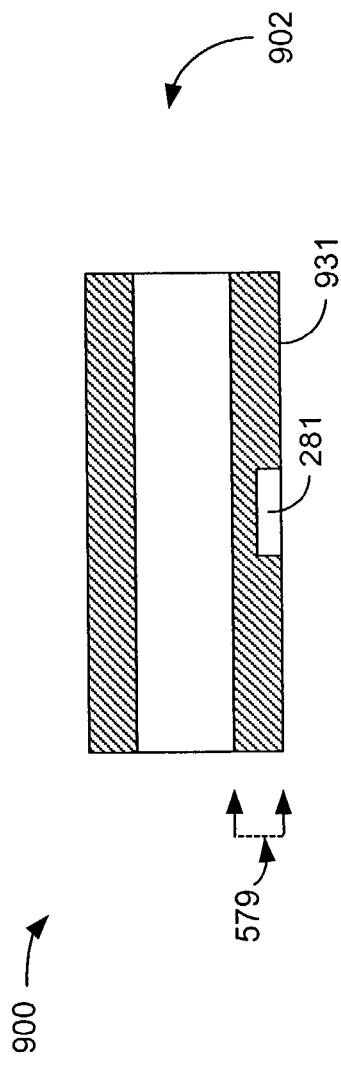
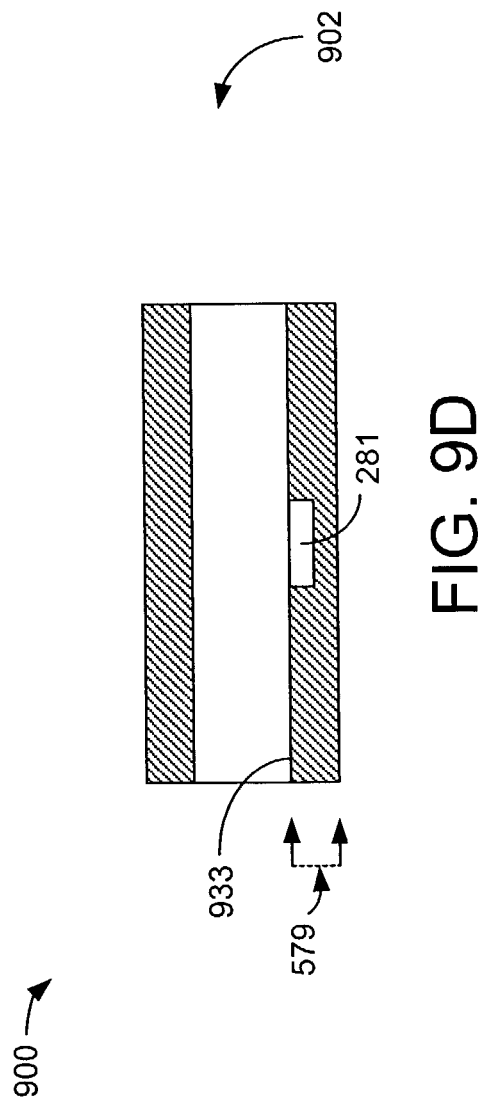

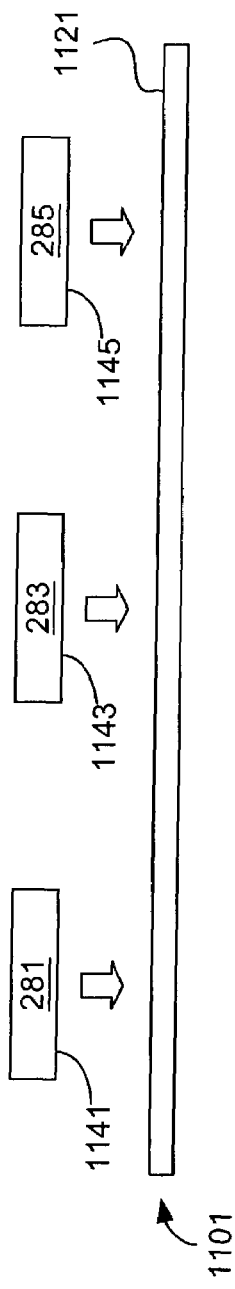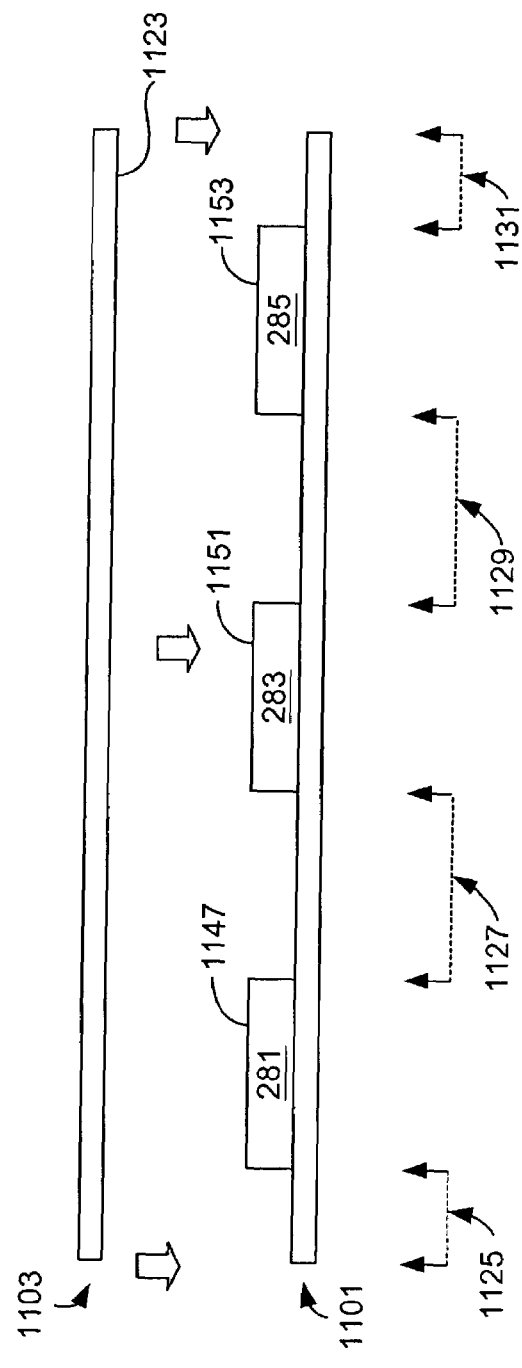

SELF-REGISTRATION SYSTEMS AND METHODS FOR DYNAMICALLY UPDATING INFORMATION RELATED TO A NETWORK

TECHNICAL FIELD

The present invention is generally related to the field of optoelectrical networks and is more particularly related to self-registration systems and methods for dynamically updating information related to a network.

BACKGROUND OF THE INVENTION

A network such as a local area network (LAN) or a wide area network (WAN) comprises multiple communication lines between network elements such as, for example, connectors, adapters, and splices. The communication lines communicate information that is embodied in electrical, electromagnetic, or optical signals. The network comprises various central offices (COs), customer premises (CPs), and nodes. Each CO comprises multiple complexes that further comprise multiple line-ups of bays. Each bay has multiple shelves and each shelf has multiple panels. Each panel comprises multiple adapters, each of which is coupled to a communication line via a connector. Each communication line can be coupled to two adapters, one adapter coupled to each end of the communication line. Both the adapters to which the communication line is coupled can be comprised in same or different panels, same or different shelves, or same or different bays.

The coupling and uncoupling of communication lines to and from the adapters are often made manually by a technician. The technician identifies the end of a communication line and an adapter to which the communication line is to be coupled or uncoupled. The technician then plugs or unplugs a connector at the end of the communication line into the appropriate adapter and reports the coupling or uncoupling to a central record system. This manual coupling and uncoupling creates a significant possibility of human error when configuring interconnections between adapters of a network.

U.S. Pat. No. 6,002,331 by Laor discloses a communication line identification apparatus and method which automates the identification of a communication line that is coupled to a particular adapter within a network. A communication transducer is mounted on a connector of the communication line. The communication transducer contains identification information of the communication line and of the adapter. Mounted near the adapter which engages the connector, is an adapter transducer which receives the identification information from the communications transducer. This identification information is transmitted to a system controller which provides the communication systems operator with the information about which communication line is connected to which adapter.

Another U.S. Pat. No. 5,394,503 by Dietz, Jr. et al. discloses an optical patch panel control system, where identification information is received from a first circuit element located at a first cable end of an fiber optic cable. A pulse code is applied on a polling line leading to the first circuit element. The first circuit element responds with a pulse code having identification information regarding the first circuit element. The identification information is stored within a control system. Moreover, identification information regarding a first port that is connected to a first connector comprising the first circuit element, is provided by first sending a poll signal via a polling line and receiving a return signal having the identification regarding the first port. The identification information is also stored within the control system. Similarly, identification information of a second port and a second circuit element at the second end of the cable is obtained and stored in the control system. A connection map, therefore, is created that provides identification information of connections of all fiber optic cables in a network. Dietz, Jr., et al., also discloses providing identification numbers of central processing units (CPUs) and devices in an optical patch panel control system to determine which CPUs and devices are in the optical patch panel control system. Additionally, Dietz Jr. et al. discloses a wired connection between the circuit element and a port. The circuit element is coupled by a data wire and a ground wire to a connector that is further coupled to a port via pins. The identification information is transmitted via the wired connection.

However, the Laor and the Dietz Jr. et al. patents are limited, in general, to providing identification information to a control system that generates a connection map showing interconnections between ports or between adapters. Specifically, Laor discloses providing a unique identification code of a communication line and an adapter to a system controller to determine whether a particular communication line is connected to an adapter. Dietz Jr. et al. discloses providing unique identification numbers of ports, and unique identification numbers of circuit elements located within connectors that are coupled to the ports, to determine whether two ports are coupled to each other by a communication line.

Furthermore, no additional information can be added to a circuit element located within a connector once the connector and the port are coupled to each other and in use. For instance, suppose when the port is engaged with the connector, the identification information is transmitted from the circuit element to the control system. A control system operator that receives the information realizes that there is a flaw in the identification information that needs to be corrected, and also thinks it would be beneficial to add some more information to the circuit element. Nevertheless, the communications systems operator cannot correct the flaw or add more information. Additionally, the wired electrical connection between the circuit element and the port is subject to wear and tear, accidental bending or breakage. The wear and tear, accidental bending and accidental breakage probably results in a loss of connection between the circuit element and the port.

Hence, a need exists in the industry to overcome the above-mentioned inadequacy of being unable to write additional information to the circuit element and the limitation of providing identification information to a control system to generate a connection map showing interconnections between ports or between adapters.

SUMMARY OF THE INVENTION

The present disclosure relates to self-registration systems and methods for dynamically updating information related to a network. Briefly described, in architecture, one embodiment of a system, among others, can be implemented as follows: a connector comprising an integrated circuit that stores a first block of information; an adapter coupled to the connector; a reader that receives the first block of information from the integrated circuit via the adapter; and a communication line coupled to the adapter via the connector, where the first block of information comprises a first block of information about network elements associated with the integrated circuit, and where the first block of information about network elements associated with the integrated circuit comprises information other than information identifying the connector, the adapter, the communication line and the integrated circuit.

The disclosure can also be viewed as providing self-registration methods for dynamically updating information related to a network. In this regard, one embodiment of a method, among others, can be broadly summarized by the following steps: coupling an adapter to a connector comprising an integrated circuit; transmitting a first block of information stored on the integrated circuit to a reader via the adapter; and coupling a communication line to the adapter via the connector, wherein the transmitting the first block of information comprises transmitting a first block of information about network elements associated with the integrated circuit, and wherein transmitting the first block of information about network elements associated with the integrated circuit comprises transmitting information other than information identifying the connector, the adapter, the communication line and the integrated circuit.

The systems and methods are not limited to reading identification information stored on the integrated circuit to generate a connection map showing interconnections between adapters but includes reading information about all elements of a network, referred to as network elements. Types of network elements include, but are not limited to, integrated circuits, readers, writers, computing devices, communication lines, connectors, adapters, panels of adapters, shelves of panels, bays of shelves, splices, fanout devices, multiplexers, switches, relays, digital access cross-connect systems and antennas.

The information about all the network elements includes, but is not limited to, information about integrated circuits of the network, readers of the network, writers of the network, computing devices of the network, communication lines of the network, connectors of the network, adapters of the network, panels of adapters of the network, shelves of panels of the network, bays of shelves of the network, multiplexers of the network, splices of the network and fanout devices of the network.

Moreover, the systems and methods allow to update the information stored on the integrated circuits of the network by using writers that write information to the integrated circuits. The information that can be written to the integrated circuits of the network is the information about the network elements.

BRIEF DESCRIPTION OF THE DRAWINGS

Many aspects of the self-registration systems and methods for dynamically updating information related to the network, can be better understood with reference to the following drawings. The components in the drawings are not necessarily to scale, emphasis instead being placed upon clearly illustrating the principles behind the systems and methods. Moreover, in the drawings, like reference numerals designate corresponding parts throughout the several views.

FIG. 4A shows an embodiment of a connector system that comprises a connector with a surface having a cavity in which an integrated circuit can be integrated.

FIG. 4B shows another embodiment of the connector system of FIG. 4A that comprises the connector with the surface having the cavity in which an integrated circuit is integrated.

FIG. 4C shows a cross-sectional side view of yet another embodiment of the connector system of FIG. 4A in which the integrated circuit is integrated in an outside wall of the surface of the connector.

FIG. 4D shows a cross-sectional side view of another embodiment of the connector system of FIG. 4A in which the integrated circuit is integrated in an inside wall of the surface of the connector.

FIGS. 8A–8E show an embodiment of a method for developing the connector system of FIGS. 4A, 4B, 5A and 5B.

FIG. 9A shows an embodiment of an adapter system that comprises a portion of an adapter with a surface having a cavity in which an antenna can be integrated.

FIG. 9B shows another embodiment of the adapter system of FIG. 9A that comprises the portion with the surface having the cavity in which the antenna is integrated.

FIG. 9C shows yet another embodiment of the adapter system of FIG. 9A in which the antenna is integrated in an outside wall of the surface of the portion of the adapter.

FIG. 9D shows another embodiment of the adapter system of FIG. 9A in which the antenna is integrated in an inside wall of the surface of the portion of the adapter.

FIGS. 11A–11C show an embodiment of a method for developing the adapter system of FIGS. 10A and 10B.

DETAILED DESCRIPTION OF THE PREFERRED EMBODIMENT

Figure 1:
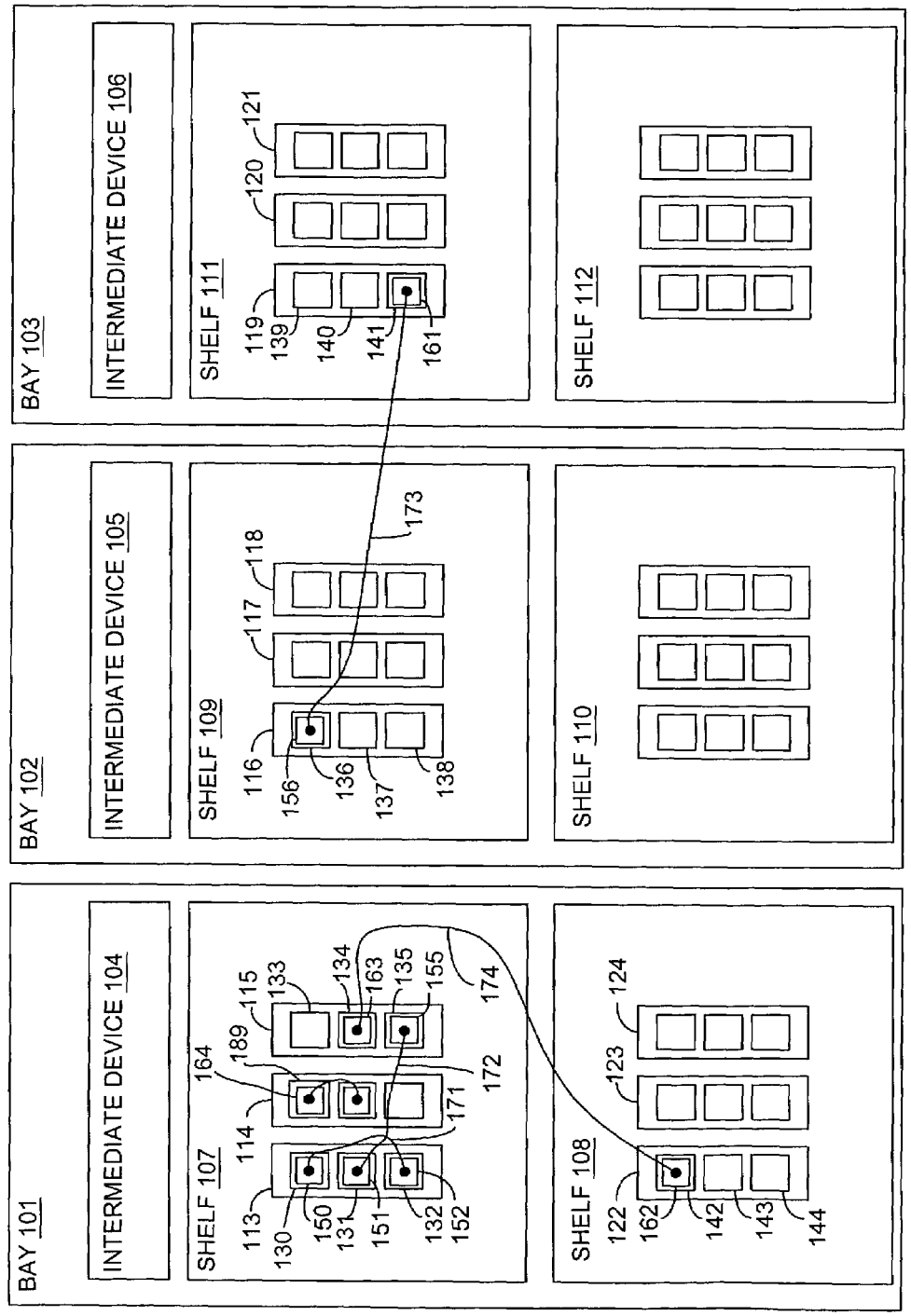
FIG. 1 shows an embodiment of a front-view a complex that comprises the self-registration systems and methods for dynamically updating information related to the network.

The present disclosure relates to self-registration systems and methods for dynamically updating information related to a network. The systems and methods are not limited to reading identification information stored on the integrated circuit to generate a connection map showing interconnections between adapters but includes reading information about all network elements. The information about all network elements includes information about integrated circuits of the network. Examples of integrated circuits of the network include name of the integrated circuits, locations of the integrated circuits in the network and identification numbers, such as, ordering identification numbers, of the integrated circuits. Moreover, the information about all network elements includes information about readers of the network. Instances of information about readers of the network include names of the readers, locations of the readers in the network, whether a reader is coupled to an integrated circuit via an adapter and identification numbers, such as, ordering identification numbers, of the readers.

Furthermore, the information about all network elements includes information about writers of the network. Illustrations of information about writers of the network include names of the writers, locations of the writers in the network, whether a writer is coupled to an integrated circuit via an adapter and identification numbers, such as, ordering identification numbers, of the writers. Additionally, the information about all network elements includes information about computing devices of the network. Examples of information about the computing devices include names of the computing devices and locations of the computing devices in the network.

Moreover, the information about all network elements includes information about communication lines of the network. Instances of the information about communication lines of the network include types, rates and wavelengths of signals propagating through the communication lines, types of fibers in the communication lines, fiber counts of the communication lines, span measurements of the communication lines, lengths of the communication lines, names of the communication lines, types of the communication lines, number of times a communication line is coupled to an adapter via a connector, locations of the communication lines in the network, identification numbers of ends of the communication lines and optical performances, such as, return losses or path losses of the communication lines. An example of the types and rates of signals includes OC 48, which is an abbreviation for optical communications at 2.5 gigabits per second. Examples of types of signals include electrical, electromagnetic and optical signals. Some instances of the operating wavelengths of the signals include 1310 nanometers (nm) and 1550 nm of signals propagating through the communication lines of the network. Illustrations of types of fibers include singlemode (SM), multimode (MM), dispersion-shifted fiber (DSF), and True Wave™. Examples of span measurements of the communication lines include attenuations of the communication lines, optical return losses (RLs) of the communication lines, and polarization mode dispersions (PMDs) of the communication lines. Some instances of types of communication lines include optical fibers, ribbons of optical fibers, bundles of optical fibers, coax cable, twisted pairs and fiber optic cables.

Furthermore information about all network elements includes information about connectors of the network. Illustrations of the information about connectors of the network include names of the connectors, types of the connectors, locations of the connectors in the network, identification numbers, such as, ordering identification numbers, of the connectors of the network and optical performances, such as, insertion losses of the connectors. Various types of connectors include FC™ connectors, SC™ connectors, ST™ connectors, LC™ connectors, MU™ connectors and MT™ connectors. The FC™, SC™, and MU™ designations are provided by Nippon Telegraph and Telephone Corp., a corporation in Japan, the ST™ designation is provided by AT&T™ Inc., and the LC™ designation is provided by Lucent Technologies™, Inc. Furthermore, information about all network elements includes information about adapters of the network. Examples of the information about adapters of the network include names of the adapters, types of the adapters, numbers of communication lines coupled to each adapter, locations of the adapters in the network, whether an adapter is coupled to a communication line via a connector, identification numbers, such as, ordering identification numbers, of the adapters of the network and optical performances, such as, insertion losses of the adapters. Adapters can comprise two receptacles or ports. Some illustrations of various types of adapters include one-port receptacles, simplex adapters, multiport receptacles, duplex adapters, multiport adapters, hybrid adapters, adapters that can be coupled to FC™ connectors, adapters that can be coupled to SC™ connectors, adapters that can be coupled to ST™ connectors, adapters that can be coupled to LC™ connectors, adapters that can be coupled to MU™ connectors and adapters that can be coupled to MT™ connectors.

Additionally, information about all network elements includes information about panels of adapters of the network. Examples of the information about the panels of the adapters include dimensions of the panels, number of adapters in each panel, and identification numbers, such as, ordering identification numbers, of the panels. Moreover, information about all network elements includes information about shelves of panels of the network. Instances of the information about the shelves of the panels include number of panels in each shelf, dimensions of the shelf, and identification numbers, such as, ordering identification numbers, of the shelves. Furthermore, information about all network elements includes information about bays of shelves of the network. Illustrations of the information about the bays include names of the bays, locations of the bays in the network and identification numbers, such as, ordering identification numbers, of the bays.

Information about all network elements also includes information about splices of the network. Examples of the information about splices of the network include names of the splices and identification numbers, such as ordering identification numbers, of the splices of the network. Moreover, information about all network elements also includes information about fanout devices of the network. Examples of the information about fanout devices of the network include names of the fanout devices and identification numbers, such as ordering identification numbers, of the fanout devices of the network. Furthermore, information about all network elements includes information about multiplexers of the network. Examples of the information about multiplexers of the network include names of the multiplexers and identification numbers, such as ordering identification numbers, of the multiplexers of the network. Some illustrations of names of multiplexers include FT-2000 and OLS 400G. FT is an abbreviation for a fiber terminal, which is a type of multiplexer. OLS is an abbreviation for optical light-wave system, which is another type of multiplexer. Hence, the systems and methods are not limited to reading identification information to generate a connection map showing interconnections between adapters of the network.

Moreover, the systems and methods allow to update information that is stored on an integrated circuit of each connector of the network by using a writer that writes information to the integrated circuit of each connector. The information that can be written includes information about network elements associated with the integrated circuit. Information about network elements associated with the integrated circuit include information about the integrated circuit, a reader that receives information from the integrated circuit, the writer, a computing device from which the writer receives information, a communication line coupled to an adapter via a connector, the connector, the adapter, a panel comprising the adapter, a shelf comprising the panel, and a bay comprising the shelf, a fanout device coupled to the connector and a splice coupled to the fanout device.

FIG. 1 shows an embodiment of a front-view a complex 100 that comprises the self-registration systems and methods for dynamically updating information related to a network. A CO (not shown) comprises multiple complexes such as the complex 100. The complex 100 helps propagate data from one CO to another CO, a CP (not shown) to a CO, or a CO to a CP. Each complex comprises at least one bay. For example, the complex 100 comprises a line-up of bays 101–103.

Each of the bays 101–103 comprises at least one shelf and at least one intermediate device. For instance, the bay 101 comprises shelves 107–108 and an intermediate device 104, the bay 102 comprises shelves 109–110 and an intermediate device 105, and the bay 103 comprises shelves 111–112 and an intermediate device 106.

A shelf comprises at least one panel of adapters. As an example, the shelf 107 comprises panels 113–115, the shelf 108 comprises panels 122–124, the shelf 109 comprises panels 116–118, and the shelf 111 comprises panels 119–121. Each panel comprises at least one adapter. To illustrate, the panel 113 comprises adapters 130–132, the panel 114 comprises an adapter 189, the panel 115 comprises adapters 133–135, the panel 116 comprises adapters 136–138, the panel 119 comprises adapters 139–141 and the panel 122 comprises adapters 142–144.

Each adapter of the complex 100 may be coupled to a communication line via a connector coupled to an end of the communication line. For instance, the adapter 130 of panel 113 is coupled to a communication line 171 via a connector 150 that is coupled to an end of the communication line 171. The adapter 132 of the same panel 113 is coupled to the communication line 171 via a connector 152 that is coupled to the other end of the same communication line 171. As a second instance, the adapter 131 of the panel 113 is coupled to a communication line 172 via a connector 151 that is coupled to an end of the communication line 172. The adapter 135 of panel 115 is coupled to the communication line 172 via a connector 155 that is coupled to the other end of the same communication line 172. As a third instance, the adapter 136 of panel 116 is coupled to a communication line 173 via a connector 156 that is coupled to an end of the communication line 173. The adapter 141 of panel 119 is coupled to the communication line 173 via a connector 161 that is coupled to the other end of the same communication line 173. As a fourth instance, the adapter 134 of panel 115 is coupled to a communication line 174 via a connector 163 that is coupled to an end of the communication line 174. The adapter 142 of panel 122 is coupled to the communication line 174 via a connector 162 that is coupled to the other end of the same communication line 174.

Each of the connectors 150–152, 155–156, 161–164 of the complex 100 can be, for example, an FC™ connector, an SC™ connector, an ST™ connector, an LC™ connector, an MU™ connector or an MT™ connector. Information is transmitted via a communication line in the form of electrical, electromagnetic, or optical signals. Furthermore, any two adapters of the complex 100 can be coupled via a communication line. The two adapters that are coupled via a communication line may be located on same or different panels, same or different shelves, or same or different bays in a complex. As an example, the adapter 130 of the panel 113 is coupled via the communication line 171 to the adapter 132 of the same panel 113. As a second example, the adapter 131 of the panel 113 of the shelf 107 is coupled via the communication line 172 to the adapter 135 of another panel 115 of the same shelf 107. As a third example, the adapter 134 of the shelf 107 of the bay 101 is coupled via the communication line 174 to the adapter 142 of another shelf 108 of the same bay 101. As a fourth example, the adapter 136 of the shelf 109 of the bay 102 is coupled via the communication line 173 to the adapter 141 of the shelf 111 of another bay 103.

An intermediate device of a bay receives signals from each adapter of the bay and also transmits signals to each adapter of the bay. The intermediate device receives signals from and transmits signals to an adapter that is coupled to a communication line. To illustrate, the intermediate device 104 receives signals from and transmits signals to the adapters 130–132, 134–135, 142 and 189 of the bay 101, the intermediate device 105 of the bay 102 receives signals from and transmits signals to the adapter 136 of the bay 102, the intermediate device 106 receives signals from and transmits signals to the adapter 141 of the bay 103.

Figure 2:
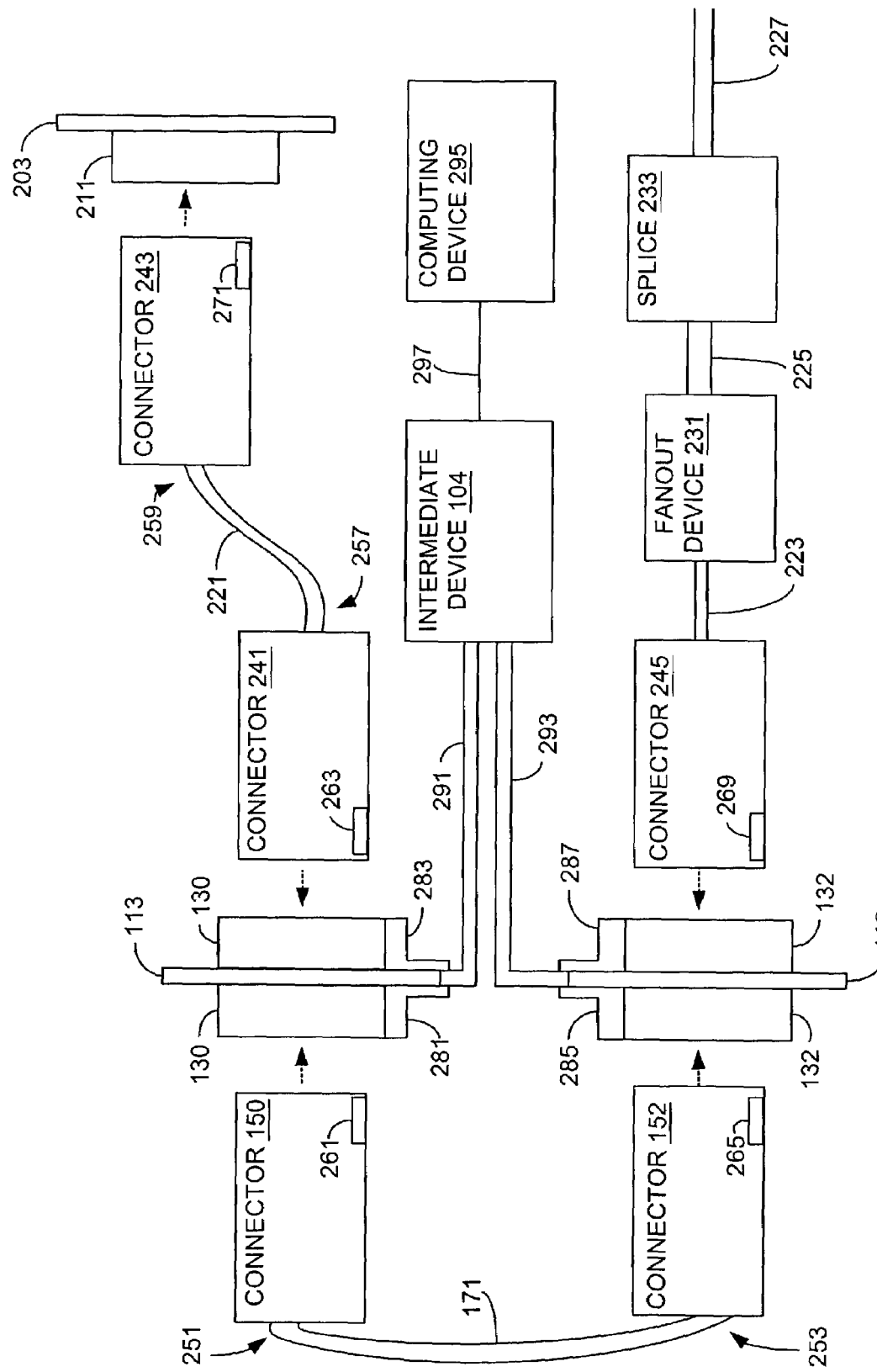
FIG. 2 shows an embodiment of a side-view of a portion of the complex of FIG. 1 that comprises the systems and methods for dynamically updating information related to the network.

FIG. 2 shows an embodiment of a side-view of a portion of the complex 100 (FIG. 1) that comprises the systems and methods for dynamically updating information related to a network. The portion comprises the panel 113 on which the adapters 130 and 132, are mounted. The portion also comprises a panel 203 on which a receptacle 211 is mounted. The portion of the complex 100 further comprises the communication line 171 that couples the adapter 130 to the adapter 132, a communication line 221 that couples the adapter 130 to the receptacle 211, a communication line 223 that couples the adapter 132 to a fanout device 231, and a communication line 225 that couples the fanout device 231 to a splice 233. The fanout device 231 splits the communication line 223 into multiple fibers that are located in the communication line 225. The splice 233 splices the communication line 225 and a communication line 227. The receptacle 211 couples the communication line 221 via a connector 243 to a network element such as, for instance, a computer, a personal digital assistant (PDA), or a telephone. The splice 233 can be coupled via the communication line 227 to an adapter located at another complex (not shown) of a network that comprises the complex 100.

Each end of the each of the communication lines 171 and 221 is coupled to an adapter via a connector. For example, an end 251 of the communication line 171 is coupled to the adapter 130 via the connector 150, an end 253 of the communication line 171 is coupled to the adapter 132 via the connector 152, an end 257 of the communication line 221 is coupled to the adapter 130 via a connector 241 and an end 259 of the communication line 221 is coupled to the receptacle 211 via a connector 243.

Each connector of the complex 100 comprises an integrated circuit. To illustrate, the connector 150 comprises an integrated circuit 261, the connector 152 comprises an integrated circuit 265, and the connector 241 comprises an integrated circuit 263, the connector 243 comprises an integrated circuit 271 and the connector 245 comprises an integrated circuit 269. An example of an integrated circuit that each connector of the complex 100 comprises is an ME-Y1001 chip manufactured by Maxell, Inc. The dimensions of the integrated circuit ME-Y1001 chip are for example, 2.5 mm length×2.5 mm breadth and 0.57 mm thickness, which are small enough to allow the chip to be integrated into a connector. As discussed below in detail, each integrated circuit can be integrated into a connector.

Each of the adapters of the panels of the complex 100 comprise at least one antenna. For instance, the adapter 130 of the panel 113 (FIG. 1) comprises antennas 281 and 283 and the adapter 132 of the panel 113 comprises antennas 285 and 287.

Antennas of all adapters of a shelf of a bay of the complex 100 can be coupled to an intermediate device of the bay. As an illustration, the antennas 281 and 283 of the adapter 130 of the shelf 107 (FIG. 1) of the bay 101 (FIG. 1) are coupled via a communication line 291 to the intermediate device 104. As another illustration, the antennas 285 and 287 of the adapter 132 of the shelf 107 of the bay 101 are coupled via a communication line 293 to the intermediate device 104. Similarly, antennas of the remaining adapters of the shelf 107 can be coupled to the intermediate device 104. Coupling of antennas of all the adapters of a shelf to only one intermediate device helps keep costs low since each intermediate device comprises a transceiver and a controller, which are expensive. Moreover, in an alternative embodiment, to further decrease costs, only one intermediate device can be coupled to antennas of all adapters of a bay. As an illustration, the intermediate device 104 can be coupled to the antennas of the adapters of the shelves 107 and 108 of the bay 101. However, in an alternative embodiment, antennas of each adapter can be coupled to a separate intermediate device. For example, the antennas 281 and 283 of the adapter 130 can be coupled to the intermediate device 104 and the antennas 285 and 287 of the adapter 132 can be coupled to another intermediate device. In such an embodiment, each intermediate device, such as the intermediate device 104, can be located in a printed circuit board (not shown) and each panel of adapters, such as, the panel 113, that are coupled to the intermediate device can be the printed circuit board. Moreover, in such an embodiment, each antenna in each adapter of the panel, has leads that couple to the printed circuit board.

The length of a communication line that couples an intermediate device of a bay to an antenna of an adapter of the bay should factor loss of communication constraints. For example, the communication lines 291 and 293 should be of minimal length, for instance, less than three meters, to avoid a loss of communication of information between the intermediate device 104 and the antennas 281–287.

The intermediate device 104 is connected to a computing device 295 via a connection 297, which can be, for instance, an RS-232 or a Universal Serial Bus (USB) connection. Alternatively, the intermediate device 104 can be coupled to the computing device 295 via a network such as WAN or a LAN. Examples of computing devices include a computer, a PDA, a controller and any other device that stores and process information.

The intermediate device 104 periodically scans the integrated circuits 261, 263, 265 and 269 by sending querying signals periodically to each of the integrated circuits. The intermediate device 104 transmits querying signals via the communication line 291 to the integrated circuits 261 and 263. The querying signals further propagate via the antenna 281 to the integrated circuit 261 and via the antenna 283 to the integrated circuit 263. The intermediate device 104 also transmits querying signals via the communication line 293 to the integrated circuits 265 and 269. The querying signals further propagate via the antenna 285 to the integrated circuit 265 and via the antenna 287 to the integrated circuit 269.

Each of the integrated circuits 261, 263, 265 and 269 receives querying signals and provides information stored on the integrated circuits to the intermediate device 104. Each of the integrated circuits provides information via an antenna and a communication line to the intermediate device 104. To explain, the integrated circuit 261 provides information stored on the integrated circuit 261 via the antenna 281 and the communication line 291 to the intermediate device 104. The integrated circuit 263 provides information stored on the integrated circuit via the antenna 283 and the communication line 291 to the intermediate device 104. The integrated circuit 265 provides information stored on the integrated circuit via the antenna 285 and the communication line 293 to the intermediate device 104. The integrated circuit 269 provides information stored on the integrated circuit via the antenna 287 and the communication line 293 to the intermediate device 104.

The intermediate device 104 obtains information stored on the integrated circuits 261, 263, 265 and 269 and further transmits the information to the computing device 295. The computing device 295 stores information that is received from the integrated circuits 261, 263, 265 and 269. A user using the computing device 295 can access the information on the computing device 295 and can know about all the network elements.

The information obtained by the computing device 295 via the intermediate device 104 is not limited to providing identification information to the computing device 295 that generates a connection map showing interconnections between adapters, such as the adapters 130 and 132, and the adapter 130 and the receptacle 211. The information that is obtained by the computing device 295 includes information stored on the integrated circuits 261, 263, 265 and 269. It is noted that the computing device 295 can also obtain information stored on the integrated circuit 271 of the connector 243 if the receptacle 211 comprises an antenna (not shown) that acts as a medium by which the information stored on the integrated circuit 271, can be transmitted to the intermediate device 104 via the communication line (not shown) coupling the antenna of the receptacle 211 and the intermediate device 104, and then can be further transmitted to the computing device 295.

Information stored on the integrated circuit 261 includes information about network elements associated with the integrated circuit 261. Information about network elements associated with the integrated circuit 261 include information about the integrated circuit 261, the intermediate device 104, the computing device 295, the communication lines 171, 291 and 297, the connector 150, the adapter 130, the panel 113 that comprises the adapter 130, the shelf 107 that comprises the panel 113 and the bay 101 that comprises the shelf 107. Examples of information about the integrated circuit 261 comprises name of the integrated circuit 261, location of the integrated circuit 261 in the network, and identification number, such as ordering identification number, of the integrated circuit 261. Instances of information about the intermediate device 104 include name of the intermediate device 104, location of the intermediate device 104 in the network, whether the intermediate device is coupled to the integrated circuit 261 via the adapter 130, and identification number, such as ordering identification number, of the intermediate device 104. Illustrations of information about the computing device 295 include name of the computing device 295 and location of the computing device 295 in the network.

Examples of information about each communication line 171, 291 and 297 include types, rates and wavelengths of signals propagating through the communication line 171, types of fibers in the communication line 171, fiber counts of the communication line 171, span measurements of the communication line 171, length of the communication line 171, name of the communication line 171, type of the communication line 171, number of times the communication line 171 is coupled to the adapter 130 via the connector 150, location of the communication line 171 in the network, identification numbers of ends 251 and 253 of the communication line 171 and optical performances, such as, return losses or path losses of the communication line 171.

Examples of information about the connector 150 include name of the connector 150, type of the connector 150, location of the connector 150 in the network, identification number, such as, ordering identification number of the connector 150 and optical performance, such as, insertion loss of the connector 150. Instances of information about the adapter 130 include name of the adapter 130, type of the adapter 130, number of communication lines coupled to the adapter 130, location of the adapter 130 in the network, whether the adapter 130 is coupled to the communication line 171 via the connector 150, identification number, such as, ordering identification number of the adapter 130 and optical performance, such as, insertion loss of the adapter 130. An example of the location of the adapter 130 in the network includes that the adapter 130 is located on the panel 113 of the shelf 107 of the bay 101 of the network.

Illustrations of information about the panel 113 that comprises the adapter 130, include dimensions of the panel 113, number of adapters in the panel 113 and identification number, such as, ordering identification number of the panel 113. Examples of information about the shelf 107 that comprises the panel 113, include number of panels in the shelf 107, dimensions of the shelf 107, and identification number, such as, ordering identification numbers, of the shelf 107. Illustrations of the information about the bay 101 includes name of the bay 101, location of the bay 101 in the network and identification number, such as, ordering identification number of the bay 101.

Information stored on the integrated circuit 263 includes information about network elements associated with the integrated circuit 263. Information about network elements associated with the integrated circuit 263 is similar to information about network elements associated with the integrated circuit 261. For example, information about network elements associated with the integrated circuit 263 includes information about the integrated circuit 263, such as, for instance, name of the integrated circuit 263, location of the integrated circuit 263 and identification number, such as ordering identification number of the integrated circuit 263. Other examples of information about network elements associated with the integrated circuit 263 include information about the intermediate device 104, the computing device 295, the communication lines 221, 291 and 297, the connector 241, the adapter 130, the panel 113 that comprises the adapter 130, the shelf 107 that comprises the panel 113 and the bay 101 that comprises the shelf 107.

Information stored on the integrated circuit 265 includes information about network elements associated with the integrated circuit 265. Information about network elements associated with the integrated circuit 265 is similar to information associated with the integrated circuit 261. For instance, information about network elements associated with the integrated circuit 265 include information about the adapter 132, such as, for instance, name of the adapter 132, type of the adapter 132, number of communication lines coupled to the adapter 132, location of the adapter 132 in the network, whether the adapter 132 is coupled to the communication line 171 via the connector 152, identification number of the adapter 132 and optical performance of the adapter 132. Other instances of information about network elements associated with the integrated circuit 265 include information about the integrated circuit 265, the intermediate device 104, the computing device 295, the communication lines 171, 293 and 297, the connector 152, the adapter 132, the panel 113 that comprises the adapter 132, the shelf 107 that comprises the panel 113 and the bay 101 that comprises the shelf 107.

Information stored on the integrated circuit 269 includes information about network elements associated with the integrated circuit 269. Information about network elements associated with the integrated circuit 269 includes information about the integrated circuit 269, the intermediate device 104, the computing device 295, the communication lines 223, 225, 227, 293 and 297, the connector 245, the splice 233 and the fan out device 231.

Information stored on the integrated circuit 271 includes information about network elements associated with the integrated circuit 271. Information about network elements associated with the integrated circuit 271 includes information about the integrated circuit 271, the intermediate device 104, the computing device 295, the communication line 221, the connector 243 and the receptacle 211.

The information received by the computing device 295 implicitly includes whether the adapters 130 and 132 are coupled to each other via the connectors 150 and 152, whether the adapter 130 and the receptacle 211 are coupled to each other via the connectors 241 and 243, whether the adapter 132 is coupled to the fanout device 231 via the connector 245, whether the fanout device 231 is coupled to the splice 233, whether the intermediate device 104 is coupled to the adapters 130 and 132, and whether the computing device 295 is coupled to the intermediate device 104. For instance, identification numbers of the end 251 of the communication line 171, the connector 150 coupled to the adapter 130 and the adapter 130 coupled to the communication line 171, can be transmitted from the integrated circuit 261 to the computing device 295. Moreover, identification numbers of the other end 253 of the communication line 171, the connector 152 that is coupled to the adapter 132, and the adapter 132 can be transmitted from the integrated circuit 265 to the computing device 295. A user using the computing device 295 can determine from the reception of the identification numbers by the computing device 295 that the adapter 130 is coupled to the adapter 132 via the connector 150, the communication line 171, and the connector 152.

Furthermore, the information received by the computing device 295 can help determine whether a connector of the network is coupled to an improper adapter of the network. For example, if the connector 150 with an identification number X2661 is coupled to the adapter 132 with an identification number N8899 instead of being coupled to the adapter 130 with an identification number N8999, the computing device 295 receives the identification numbers of the connector 150, the adapter 130 and the adapter 132 so that a user of the computing device 295 can compare the received identification numbers to a standard list that shows that the connector 150 should be coupled to the adapter 130 instead of the adapter 132. The user, therefore, can figure that the connector 150 is coupled to the adapter 132 when it should be coupled to the adapter 130.

Additionally, information that is received by the computing device 295 can help determine whether a connector of the network is inadvertently uncoupled from an adapter of the network. To illustrate, if the connector 150 is inadvertently uncoupled from the adapter 130, the computing device 295 stops receiving identification number of the connector 150 since the intermediate device 104 that periodically scans the integrated circuit 261 stops receiving information stored on the integrated circuit. Therefore, a user of the computing device 295 can know that there has been an uncoupling of the connector 150 from the adapter 130. The user knows beforehand from the standard list, that the connector 150 should be coupled to the adapter 130 and hence, concludes that the uncoupling was inadvertent.

The information that is received by the computing device 295 further includes the number of times the communication line 171 is coupled to the adapters 130 and 132, the number of times the communication line 221 is coupled to the adapter 130 and to the receptacle 211 and the number of times the communication line 223 is coupled to the adapter 132. As an illustration, the integrated circuit 263 can comprise a counter (not shown) that counts the number of times the communication line 221 is coupled to the adapter 130 via the connector 241.

The computing device 295 can obtain the count and compare the count stored in the computing device 295 to determine whether the adapter 130 or the communication line 221 should be replaced because of wear and tear. For example, if the count shows that the number of times the communication line 221 is coupled to the adapter 130 is above a certain threshold, the adapter 130 or the communication line 221 should be replaced since either the adapter 130 or the communication line 221 has presumably undergone a sufficient amount of wear and tear. If the count is below the threshold, no such replacements should be made since presumably neither the adapter 130 nor the communication line 221 has undergone a sufficient amount of wear and tear.

If the computing device 295 can obtain information that is stored on the integrated circuits 261, 263, 265, 269 and 271, the computing device 295 can similarly obtain information that is stored on integrated circuits of all the connectors of the complex 100. For example, the computing device 295 can be connected to all the intermediate devices 104–106 (FIG. 1) of the complex 100 to obtain information stored on integrated circuits of connectors of the bays 101–103 (FIG. 1). If the computing device 295 can obtain information stored on integrated circuits of all the connectors of the complex 100, the computing device 295 similarly can obtain information stored on integrated circuits of all connectors of a CO that comprises multiple complexes such as the complex 100. If the computing device 295 can obtain information stored on integrated circuits of all the connectors of a CO, the computing device 295 similarly can obtain information stored on integrated circuit of all connectors of a network that comprises multiple COs. Hence, the computing device 295 can obtain information about all the network elements. Thus, the information obtained by the computing device 295 via the intermediate device 104 is not limited to providing identification information to the computing device 295 that generates a connection map showing interconnections between adapters of the network, such as, for instance, the adapters 130 and 132, and between the adapter 130 and the receptacle 211 of the complex 100.

Information can not only be read from an integrated circuit by transmitting the information from an integrated circuit to the computing device 295 via an intermediate device but information can also be written to the integrated circuit by transmitting the information from the computing device 295 to the integrated circuit via the intermediate device. As an example, the user of the computing device 295 can transmit information to be written to the integrated circuit 269 from the computing device 295 via the communication line 297 to the intermediate device 104. The intermediate device 104 further transmits the information via the communication line 293 and the antenna 287 to the integrated circuit 269. The integrated circuit 269 stores the information. Information can similarly be written on the integrated circuit 265 by transmitting the information from the computing device 295, the intermediate device 104, the communication line 293, and the antenna 285 to the integrated circuit 265. Information can also be written on the integrated circuits 261 and 263 in a similar manner by transmitting the information from the computing device 295 to the integrated circuits 261 and 263. Moreover, information can be written to the integrated circuit 271 in a similar manner if the integrated circuit 271 can receive information via an antenna (not shown) of the receptacle 211, a communication line (not shown) that couples the antenna to the intermediate device 104, and the communication line 297. Hence, information can be written to any of the integrated circuits 261, 263, 265, 269 and 271 by transmitting the information from the computing device 295 to the integrated circuits 261, 263, 265, 269 and 271.

The information that can be written to each integrated circuit 261, 263, 265, 269 and 271 includes information about network elements associated with the integrated circuit. Instances of information about network elements associated with the integrated circuit 261 include information about the integrated circuit 261, the intermediate device 104, the computing device 295, the communication lines 171, 291 and 297, the connector 150, the adapter 130, the panel 113 comprising the adapter 130, the shelf 107 comprising the panel 113, and the bay 101 comprising the shelf 107. Examples of information about the integrated circuit 261, the intermediate device 104, the computing device 295, the communication lines 171, 291 and 297, the connector 150, the adapter 130, the panel 113 comprising the adapter 130, the shelf 107 comprising the panel 113, and the bay 101 comprising the shelf 107, were provided above. Additional examples of information about the adapter 130 include whether the adapter 130 is coupled to the adapter 132 via connectors 150 and 152, whether the adapter 130 is coupled to the receptacle 211 via connectors 241 and 243 and whether the adapter 130 is coupled to the intermediate device 104. Moreover, some more examples of information about the communication line 171 include a number of times the communication line 171 is coupled to the adapter 130 via the connector 150 and a number of times the communication line 171 is coupled to the adapter 132 via the connector 152.

Moreover, examples of information about network elements associated with the integrated circuit 263 are similar to instances of information about network elements associated with the integrated circuit 261. Examples of information about network elements associated with the integrated circuit 263 include information about the integrated circuit 263, the intermediate device 104, the computing device 295, the communication lines 221, 291 and 297, the connector 241, the adapter 130, the panel 113 comprising the adapter 130, the shelf 107 comprising the panel 113 and the bay 101 comprising the shelf 107. Additional examples of information about the communication line 221 includes a number of times the communication line 221 is coupled to the adapter 130 via the connector 241 and a number of times the communication line 221 is coupled to the receptacle 211 via the connector 243.

Furthermore, examples of information about network elements associated with the integrated circuit 265 are similar to instances of information about network elements associated with the integrated circuit 261. Examples of information about network elements associated with the integrated circuit 265 include information about the integrated circuit 265, the intermediate device 104, the computing device 295, the communication lines 171, 293 and 297, the connector 152, the adapter 132, the panel 113 comprising the adapter 132, the shelf 107 comprising the panel 113 and the bay 101 comprising the shelf 107. Some more examples of information about the adapter 132 includes whether the adapter 132 is coupled to the adapter 130, whether the adapter 132 is coupled to the fanout device 231 and whether the adapter 132 is coupled to the intermediate device 104.

Furthermore, examples of information about network elements associated with the integrated circuit 269 are similar to instances of information about network elements associated with the integrated circuit 261. Examples of information about network elements associated with the integrated circuit 269 include information about the integrated circuit 269, the intermediate device 104, the computing device 295, the communication lines 223, 225, 227, 293 and 297, the connector 245, the adapter 132, the panel 113 comprising the adapter 132, the shelf 107 comprising the panel 113, the bay 101 comprising the shelf 107, the fanout device 231 coupled to the connector 245 and the splice 233 coupled to the fanout device 231. Illustrations of information about the communication line 223 include a number of times the communication line 223 is coupled to the adapter 132 via the connector 245. Moreover, examples of information about the splice 233 include whether the splice 233 is coupled to the fanout device 231. Furthermore, instances of information about the fanout device 231 include whether the fanout device 231 is coupled to the splice 233. Additionally, illustrations of information about network elements associated with the integrated circuit 271 are similar to instances of information about network elements associated with the integrated circuit 261. Illustrations of information about network elements associated with the integrated circuit 271 include information about the integrated circuit 271, the intermediate device 104, the computing device 295, the communication line 221, the connector 243 and the receptacle 211. Examples of information about the receptacle 211 include whether the receptacle 211 is coupled to the adapter 130 via the communication line 221 and via the connectors 241 and 243.

Moreover, the information that can be written to one of the integrated circuits 261, 263, 265, 269 and 271 includes whether another integrated circuit of the network can transmit information to and receive information from the computing device 295 via the intermediate device 104. As an example, a user can write to the integrated circuit 263 of the connector 241 that an integrated circuit 271 of the connector 243 cannot transmit information to and receive information from the computing device 295. The integrated circuit 271 cannot transmit information to and receive information from the computing device 295 since the receptacle 211 does not comprise a medium, such as an antenna, through which the integrated circuit 271 can receive information from and transmit information to the computing device 295. It is noted, however, that the receptacle 211 can comprise such a medium.

Information regarding any network element can be written to any of the integrated circuits 261, 263, 265, 269 and 271 that are coupled to the computing device 295 via the intermediate device 104. To illustrate, identification number of the integrated circuit 271 located at one end 259 of the communication line 221 can be written to the integrated circuit 263 at the other end 257 of the communication line 221. As another illustration, information that the end 259 is to be coupled to the receptacle 211 can be written on the integrated circuit 263 at the end 257 of the communication line.

It is noted that an integrated circuit may be comprised in a panel of a complex instead of being comprised in the connectors that couple communication lines to adapters of the panel. As an example, an integrated circuit may be comprised in the panel 113 of the complex 100 instead of being comprised in each connector of the panel 113. Information related to the network elements, such as, for instance, the adapters of the panel 113, connectors coupled to the adapters of the panel 113, and communication lines to which the adapters of the panel 113 are coupled, can be written to and read from the integrated circuit of the panel 113. Costs decrease with the number of integrated circuits used in a network since although each integrated circuit is inexpensive, a large number of integrated circuits can result in high costs.

Figure 3:
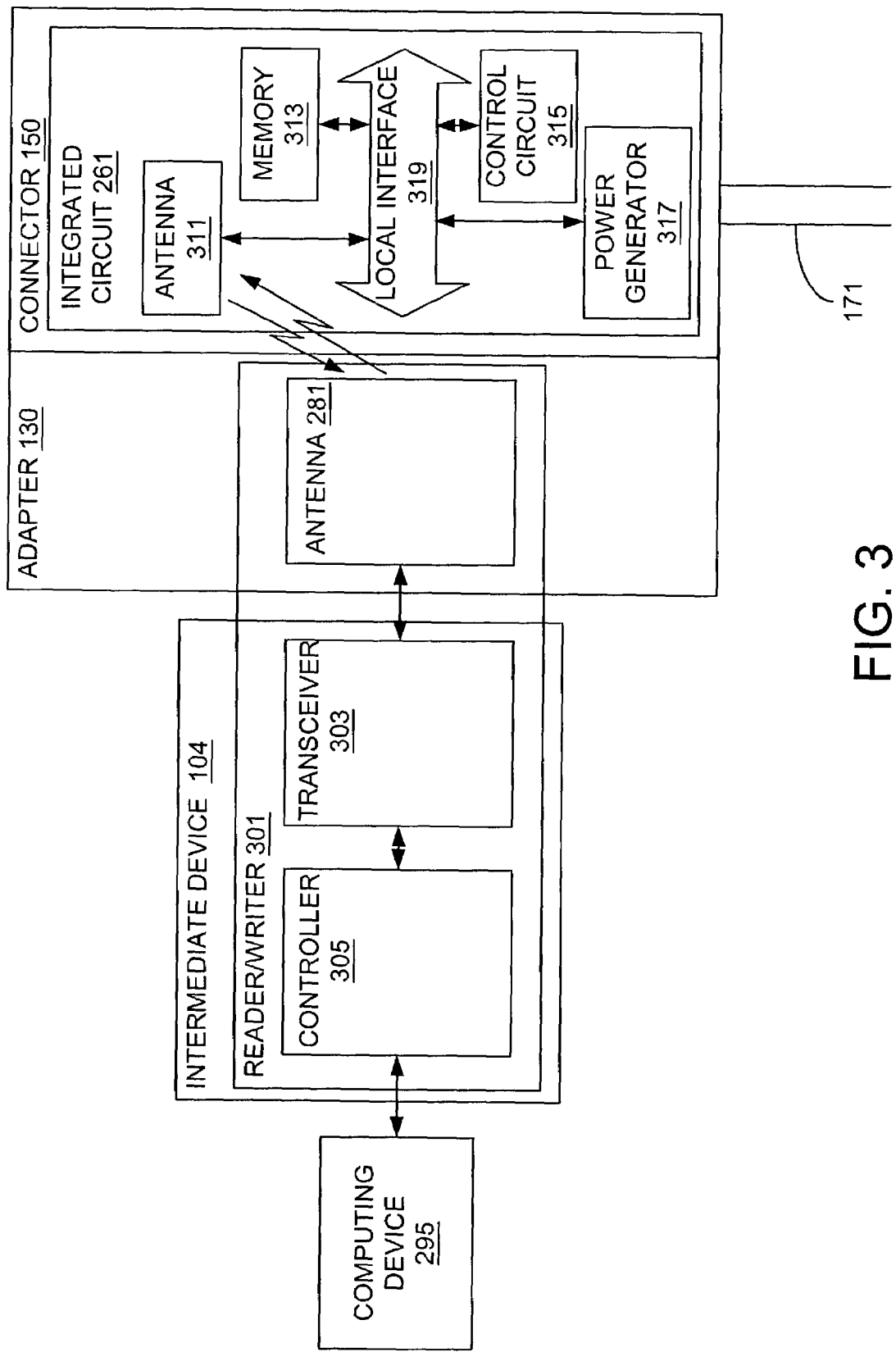
FIG. 3 shows an embodiment of the self-registration systems for dynamically updating information related to the network.

FIG. 3 shows an embodiment of the self-registration systems for dynamically updating information related to the network. The embodiment comprises one of the connectors of the complex 100 of FIG. 1, for instance, the connector 150; one of the adapters of the complex 100 that is coupled to the connector, for example, the adapter 130; the intermediate device coupled to the connector via the adapter, for instance, the intermediate device 104; and a computing device coupled to the intermediate device 104, for example, the computing device 295. The connector 150 comprises the integrated circuit 261, which can be integrated in a variety of ways described below, into the connector 150.

The integrated circuit 261 comprises an antenna 311 coupled to a control circuit 315, a power generator 317, and a memory 313 via a local interface 319. The power generator 317 provides power to the control circuit 315 and the memory 313. The local interface 319 can be, for example but not limited to, one or more buses or other wired or wireless connections. The local interface 319 may have additional elements, which are omitted for simplicity, such as, for example controllers, buffers, drivers, repeaters, and receivers, to enable communications. Further, the local interface 319 may include address, control or data connections, to enable appropriate communications among the aforementioned components. It is noted that the integrated circuit 261 may not comprise the power generator 317, in which case, the power to the memory 313 and the control circuit 315 can be provided by querying signals that are transmitted periodically, such as, for instance, every few milliseconds, from a transceiver 303 of the intermediate device 104, via the antenna 281 of the adapter 130, to the integrated circuit 261 of the connector 150. When the querying signals provide power, the control circuit 315 modulates the querying signals with information stored in the memory 313 so that the information can be transmitted to the transceiver 303. It is noted that the transceiver 303 can be comprised in the adapter 130 instead of being comprised in the intermediate device 104.

The adapter 130 comprises the antenna 281 that acts as a medium by which the transceiver 303 receives information from and transmits information to the integrated circuit 261. The antenna 281 of the adapter 130 and the antenna 311 of the connector 150 provide a wireless electrical connection between the transceiver 303 of the intermediate device 104 and the integrated circuit 261 of the connector 150 so that the transceiver 303 can receive information from and transmit information to the integrated circuit 261 of the connector 150. The information that is transmitted to and received from the integrated circuit 261, via the antennas 281 and 311, by the transceiver 303, can be embodied in, for instance, electrical, electromagnetic, or optical signals. A wireless electrical connection between the transceiver 303 and the integrated circuit 261 is beneficial compared to a wired electrical connection between the transceiver 303 and the integrated circuit 261 of the connector 150 since the wired electrical connection is subject to wear and tear or accidental breakage. Each of the wear and tear and accidental breakage generally results in a loss of connection between the transceiver 303 and the integrated circuit 261. However, a wired electrical connection can be used between the transceiver 303 and the integrated circuit 261.

The antenna 281 of the adapter 130 and the antenna 311 of integrated circuit 261 of the connector 150 should be in close proximity with each other to enable communication of information with the antenna 311 of the integrated circuit 261. As an example, if no booster antenna (not shown) is used in conjunction with the antenna 281 of the adapter 130 and the antenna 311 of the integrated circuit 261, the distance between the two antennas should not be more than 3 mm to enable communication of information between the antennas 281 and 311. However, if the booster antenna is used, the distance between the antenna 311 of the integrated circuit 261 and the antenna 281 of the adapter 130 can be at most 20 mm to enable the communication.

The intermediate device 104 comprises a controller 305 and the transceiver 303. The controller 305 comprises a processor (not shown) that controls the operations of the intermediate device 104, such as, for instance, rate of transfer of information between the computing device 295 and the transceiver 303, or commanding the transceiver 303 to periodically send querying signals to the integrated circuit 261 of the connector 150. The controller 305 also comprises a memory (not shown) coupled to the processor of the controller 305. The transceiver 303 is coupled to the antenna 281 of the adapter 130.

A reader/writer 301 comprises the antenna 281 of the adapter 130, the transceiver 303 and the controller 305. The computing device 295 that is connected to the controller 305 can be, for instance, a computer, a PDA, a controller or any other device that stores and process information. The computing device 295 can be connected to the controller 305 via, for example, a USB connection that propagates infrared signals or an RS-232 connection that is a wired electrical connection. Alternatively, the computing device 295 can be connected to the controller 305 via a network such as a LAN or a WAN.

The reader/writer 301 reads information from the memory 313 of the integrated circuit as follows. The controller 305 commands the transceiver 303 to periodically send querying signals via the antenna 281 of the adapter 130 to the antenna 311 of the integrated circuit 261 of the connector 150. Querying signals are usually sent at intervals of milliseconds, such as, for example, every forty milliseconds. The control circuit 315 receives and recognizes the querying signals via the antenna 311 of the connector 150 and commands the memory 313 to release information stored in the memory 313. The transceiver 303 then receives the information via the antenna 311 of the connector 150 and the antenna 281 of the adapter 130. Thereafter, the transceiver 303 transmits the information to the controller 305 that can store the information temporarily, in the memory of the controller 305 to control the rate of transfer of information to the computing device 295. Hence, the reader/writer 301 reads information from the memory 313 of the integrated circuit. The transceiver 303 transmits the information via the controller 305 to the computing device 295 that stores the information so that a user who uses the computing device 295 can access the information.

The information stored in the computing device 295 is not limited to identification information, such as, for instance, identification information of the integrated circuit 261, the connector 150, the adapter 130, the integrated circuit 265 (FIG. 2), the connector 152 (FIG. 2) and the adapter 132 (FIG. 2) to determine whether there is an interconnection between the adapter 130 and the adapter 132 of the network. The information that is obtained by the computing device 295 from the integrated circuit 261 includes information about network elements associated with the integrated circuit 261. Examples of information about network elements associated with the integrated circuit 261 include information about the integrated circuit 261, the intermediate device 104, the computing device 295, the communication line 171, the connector 150 and the adapter 130. Some additional examples of information about network elements associated with the integrated circuit 261 include information about the reader/writer 301, the controller 305, the transceiver 303, the antenna 281, the antenna 311, the memory 313, the local interface 319, the control circuit 315 and the power generator 317. Illustrations of information about the integrated circuit 261, the intermediate device 104, the computing device 295, the communication line 171, the connector 150 and the adapter 130, were provided above. Instances of information about the reader/writer 301 include name of the reader/writer 301, location of the reader/writer 301 in the network, whether the reader/writer 301 is coupled to the integrated circuit 261 via the adapter 130 and identification number of the reader/writer 301.

If the computing device 295 can obtain information stored on the integrated circuit 261 of the connector 150, the computing device 295 can also obtain information stored on the integrated circuits of all connectors of the complex 100 of the network in a similar fashion and a user can access information that is obtained by the computing device 295 to know about all elements of the complex 100. If the user can be informed about all elements in one complex, the user can also be informed, in a similar fashion, about network elements in multiple complexes that are comprised in a CO. If the user can be informed about network elements in one CO, it follows that the user can know about network elements in multiple COs and so know about all elements in a network comprising the multiple COs. Hence, the user can obtain information about all network elements. Thus, information stored in the computing device 295 is not limited to identification information of the integrated circuit 261, the connector 150, the adapter 130, other integrated circuits, other connectors, and other adapters of a network to determine interconnections between the adapters of the network.

Furthermore, information can be written to the memory 313 of the integrated circuit 261 by first transmitting the information from the computing device 295 to the controller 305 of the reader/writer 301. The reader/writer 301 writes to the memory 313 of the integrated circuit 261 as follows. The controller 305 may temporarily store information that is received from the computing device 295, in the memory of the controller 305, to control the rate of transfer of information between the computing device 295 and the transceiver 303. The transceiver 303 receives the information from the controller 305 and transmits the information via the antenna 281 of the adapter 130 and the antenna 311 of the connector 150 to the control circuit 315 of the integrated circuit 261 of the connector 150. The control circuit 315 receives the information and stores the information in the memory 313 of the integrated circuit 261. Hence, the reader/writer 301 writes information to the memory 313 of the integrated circuit 261.

The information that is written to the memory 313 of the integrated circuit 261 includes information about network elements associated with the integrated circuit 261. Illustrations of information about network associated with the integrated circuit 261 include information about the integrated circuit 261, the intermediate device 104, the computing device 295, the communication line 171, the connector 150, the adapter 130, the reader/writer 301, the controller 305, the transceiver 303, the antenna 281, the antenna 311, the memory 313, the local interface 319, the control circuit 315 and the power generator 317. Examples of information about the integrated circuit 261, the intermediate device 104, the computing device 295, the communication line 171, the connector 150, the adapter 130 and the reader/writer 301, were provided above.

It is noted that any of the functions of the controller 305 can be alternatively performed by the computing device 295. As an illustration, instead of the controller 305, the computing device 295 may command the transceiver 303 to send querying signals periodically to the antenna 311 of the connector 150 via the antenna 281 of the adapter 130. Moreover, the computing device 295 also performs functions that cannot be performed by the controller 305. For instance, a user can use the computing device 295 to command the transceiver 303 to send a querying signal to the antenna 311 of the connector via the antenna 281 of the adapter 130. In such a case, querying signals cannot act as a source of power for the memory 313 and control circuit 315 of the integrated circuit 261 since querying signals are not sent periodically by the transceiver 303. Thus, in such a case, the power generator 317 provides power to the memory 313 and the control circuit 315 of the integrated circuit 261.

Moreover, it is noted that in an alternative embodiment, the integrated circuit 261 can be comprised in the adapter 130 instead of the connector 150. In such an embodiment, the antenna 281 is comprised in a panel, such as the panel 113, on which the adapter 130 is located.

The present disclosure also relates to connector systems for dynamically updating information related to the network and methods for developing the connector systems. FIG. 4A shows an embodiment of a connector system 400 that comprises a plug body 410 of the connector 150 (FIGS. 1–3) and a cavity 401 formed on a surface 416 of the connector 150, in which the integrated circuit 261 (FIG. 3) can be integrated. The connector 150 is preferably a push-pull connector. Examples of push-pull connectors include, but are not limited to, LC™, MU™, SC™, and MT™ connectors. The integrated circuit 261 is integrated into the plug body 410 by placing the integrated circuit into the cavity 401 and then placing a tape 412 in a cavity 414 formed on the surface 416 of the plug body 410 of the connector 150. It is noted that the depth of the cavity 414 is less than the sum of the depths of the cavities 414 and 401. Moreover, it is noted that preferably, the shape of the cavity 401 conforms to the shape of the integrated circuit 261 and the integrated circuit 261 can be of any shape, such as, for instance, circular, triangular, rectangular, hexagonal or square. It is also noted that preferably, the shape of the cavity 414 conforms to the shape of the tape 412 and the tape 412 can be of any one of the shapes mentioned above.

The tape 412 holds the integrated circuit 261 in the cavity 401 because the tape 412 strongly adheres to the cavity 414. An adhesive, such as, for instance, a pressure-sensitive permanent adhesive, on a surface 418 of the tape 412 helps to form a strong bond between the cavity 414 and the surface 418 of the tape 412 so that the tape 412 can strongly adhere to the cavity 414.

The tape 412 is made of sturdy material, such as, for example, polyimide or polyester, to protect the integrated circuit 261 from damage. An example of a polyimide is Kapton® and an example of a polyester is Mylar®. Both Kapton® and Mylar® are trademarks of E.I. du Pont de Nemours and Company. Damage to the integrated circuit 261 can be caused by various sources, such as, for instance, contact with hands of the user or by adverse environmental conditions. Illustrations of adverse environmental conditions include water and dirt. The tape 412 can be transparent or colored. Colored tapes can help identify a coupling of two connectors. As an illustration, a blue colored tape on the plug body 410 of the connector 150 and a blue colored tape on a plug body of the connector 152 (FIGS. 1–2) helps identify that the connectors 150 and 152 are coupled to each other. Moreover, the tape can be a label that displays information, such as, for instance, identification number of the integrated circuit 261 or name of manufacturer of the integrated circuit 261.

In an alternative embodiment, the integrated circuit 261 can be integrated into the plug body 410 of the connector 150 without being held by the tape 412. For example, the integrated circuit can be integrated into the plug body 410, by using a fastener, such as, for example, glue or screws. Nevertheless, without placing the tape 412 in the cavity 414 to hold the integrated circuit 261 in the cavity 401, the integrated circuit is exposed to damage from the various sources. It is noted that it is not necessary to form the cavity 414 if a user does not intend to use the tape 412 to integrate the integrated circuit 261 into the plug body 410. In another alternative embodiment, the integrated circuit 261 can be integrated into the plug body 410 of the connector 150 by using the tape 412 in addition to the fastener to provide a stronger hold to the integrated circuit 261 than that provided solely by the tape 412.

FIG. 4B shows another embodiment of the connector system 400 that comprises the plug body 410 of the connector 150 (FIGS. 1–3) in which the integrated circuit 261 (FIG. 4A) is integrated with the help of the tape 412. The cavities 401 (FIG. 4A) and 414 (FIG. 4A) should be of such dimensions that the tape 412 does not protrude outwards from the surface 416 (FIG. 4A) of the plug body 410. To illustrate, the dimensions of the cavity 401 should be 2.6 mm×2.6 mm×0.57 mm and the cavity 414 should be 4.6 mm×2.3 mm×0.13 mm to integrate the ME-Y1001 chip manufactured by Maxell, Inc. into the plug body 410 of the connector 150, using the tape 412 of dimensions, such as, 4.6 mm×3.4 mm×0.10 mm so that the tape 412 does not protrude outwards from the surface 416 of the plug body 410. If there is such a protrusion, a user may not be able to uncouple the connector 150 from the adapter 130.

FIG. 4C shows a cross-sectional side view of yet another embodiment of the connector system 400 that comprises the plug body 410 of the connector 150 (FIG. 3) in which the integrated circuit 261 is integrated. The integrated circuit 261 is integrated in an outside wall 431 of the surface 416 of the plug body 410. FIG. 4D shows a cross-sectional side view of another embodiment of a connector system 400 in which the integrated circuit 261 is integrated in an inside wall 433 of the surface 416 of the plug body 410.

Figures 5A, 5B:
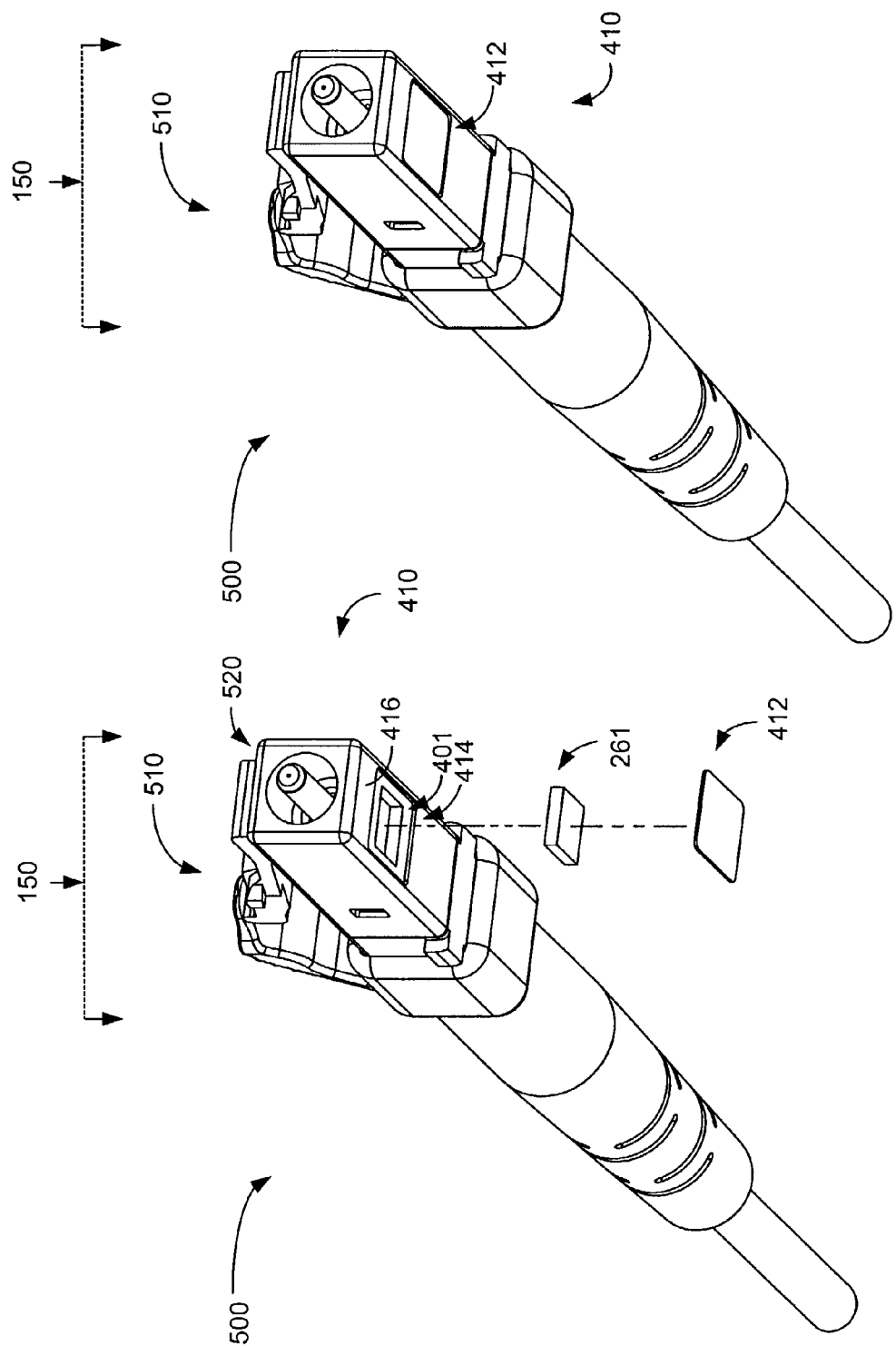
FIG. 5A shows an embodiment of a connector system that comprises a connector with a surface having a cavity in which an integrated circuit can be integrated.
FIG. 5B shows another embodiment of the connector system of FIG. 5A that comprises the connector with the surface having the cavity in which an integrated circuit is integrated.

FIG. 5A shows an embodiment of a connector system 500 for dynamically updating information related to the network. The connector system 500 includes the connector 150 with a latch 510 and the cavity 401 in which the integrated circuit 261 can be integrated using the tape 412. The latch 510 is on a surface 520 which is located opposite to the surface 416 in which the cavities 401 and 414 are formed to integrate the integrated circuit 261.

Figure 5C:
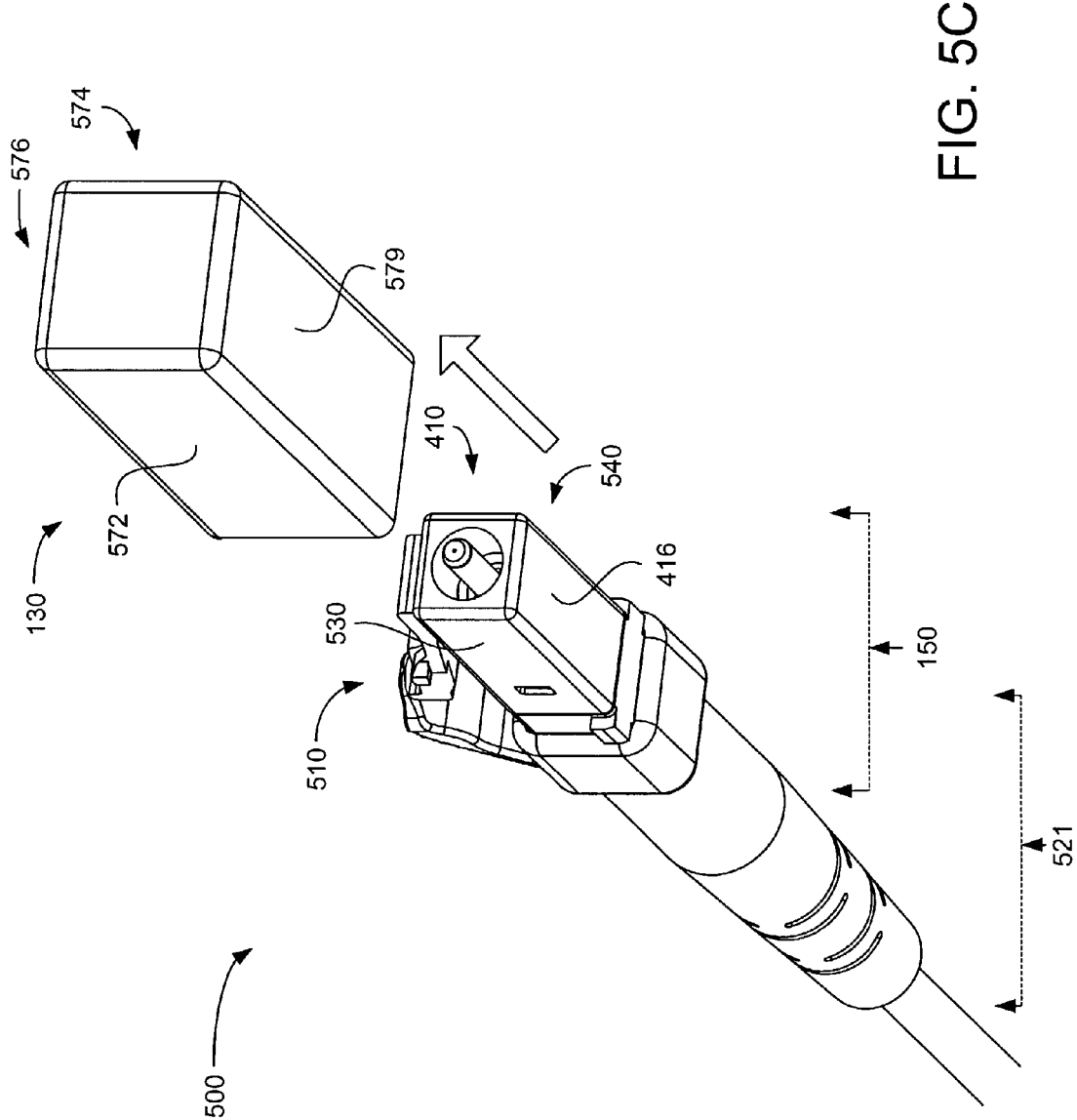
FIG. 5C shows yet another embodiment of the connector system of FIG. 5A and an adapter that can be coupled to the connector of the connector system.

FIG. 5B shows a second embodiment of the connector system 500. The connector system 500 includes the connector 150 with the latch 510 and the cavity 401 (FIG. 5A) in which the integrated circuit 261 (FIG. 5A) is integrated. FIG. 5C shows a third embodiment of the connector system 500 and the portion 902 of the adapter 130 (FIGS. 1 2, and 3) to which the connector 150 of the connector system 500, can be coupled. In the third embodiment, the cavities 401 (FIG. 5A) and 414 (FIG. 5A) can be formed on a side surface 530 of the plug body 410 of the connector 150 to integrate the integrated circuit 261 (FIG. 5A) into the side surface 530 using the tape 412 (FIG. 5A). Moreover, in the third embodiment, the antenna 281 (FIG. 2) of the adapter 130 should be comprised in a side surface 572 of the portion 902 of the adapter 130 so that the antenna 311 (FIG. 3) of the integrated circuit 261 and the antenna 281 of the adapter 130 are in close proximity to each other to enable transmission and reception of information between the two antennas.

In a fourth embodiment, the cavities 401 and 414 can be formed on another side surface 540 of the plug body 410 of the connector 150 to integrate the integrated circuit 261 into the side surface 540 using the tape 412. In the fourth embodiment, the antenna 281 of the adapter 130 should be comprised in a side surface 574 of the portion 902 of the adapter 130 so that the antenna 311 of the integrated circuit 261 and the antenna 281 of the adapter 130 are in close proximity to each other to enable transmission and reception of information between the two antennas.

In a fifth embodiment, the integrated circuit 261 of the connector 150 can be integrated into the latch 510 or alternatively, in the top surface 520 (FIG. 5A) of the connector 150. In both cases of the fifth embodiment, the antenna 281 of the adapter 130 should be comprised in a top surface 576 of the portion 902 of the adapter 130 so that the integrated circuit 261 and the antenna 281 are in close proximity to each other to enable transmission and reception of information between the two antennas.

When the integrated circuit 261 is integrated in the surface 416 of the connector 150, the antenna 281 of the adapter 130 should be comprised in a bottom surface 579 of the portion 902 of the adapter 130 so that the integrated circuit 261 and the antenna 281 are in close proximity to each other to enable transmission and reception of information between the two antennas. In an alternative embodiment of the connector system 500, the integrated circuit 261 can be integrated in a surface of a strain relief 521 coupled to the connector 150, using the methods, which are described in detail below.

Figure 6A:
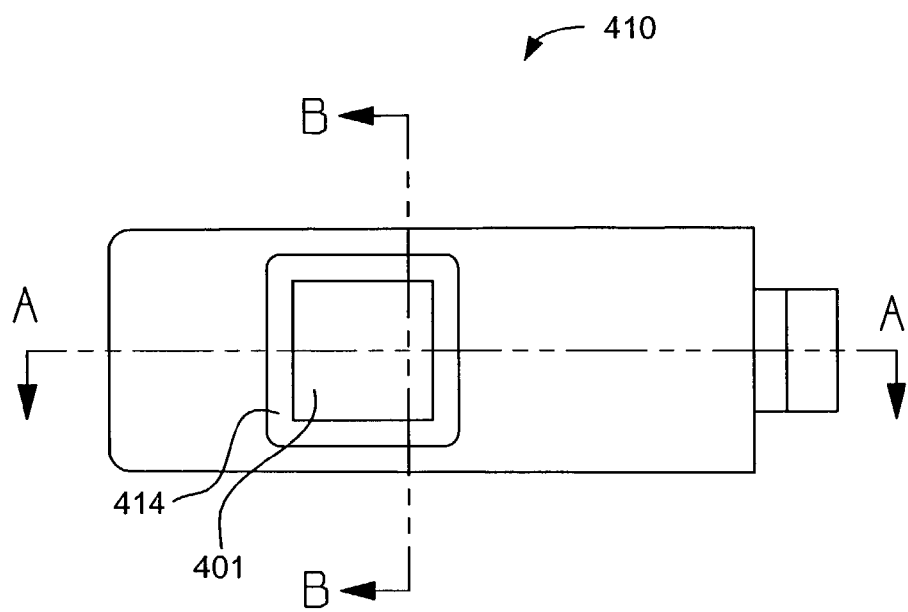
FIG. 6A shows a bottom view of an embodiment of the connector of the connector system of FIG. 5A.
Figure 6B:
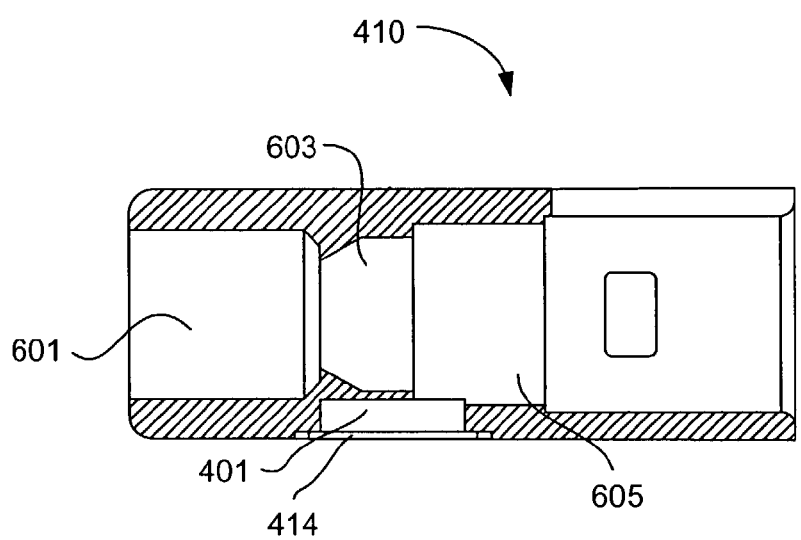
FIG. 6B shows a cross-section of the embodiment of the connector of the connector system of FIG. 5A.

FIG. 6A shows a bottom view of an embodiment of the plug body 410 of the connector 150 (FIGS. 1–3, 5A–5B) with the cavities 401 and 414. FIG. 6B shows a cross-section A—A (FIG. 6A) of the plug body 410 of the connector 150 (FIGS. 1–3, 5A–5B). The plug body 410 comprises a ferrule cavity 601, a barrel cavity 603, a spring cavity 605 in which a spring (not shown) is located, and the cavities 401 and 414.

Figure 6C:
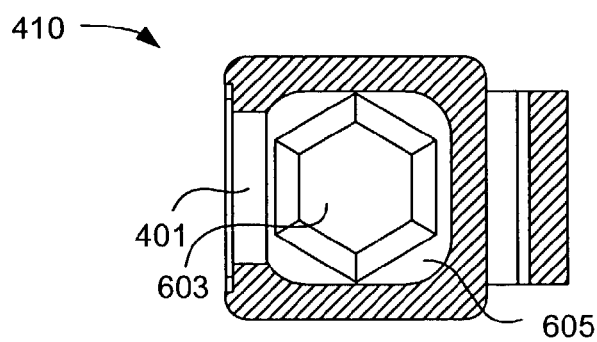
FIG. 6C shows another cross-section of the embodiment of the connector of the connector system of FIG. 5A.

FIG. 6C shows a cross-section B—B (FIG. 6A) of the plug body 410 of the connector 150 (FIGS. 1–3, 5A–5B). During a molding operation, where a machine is used to mold the spring cavity 605 and the cavity 401, there is a possibility that a steel core that forms the cavity 401 may come in contact with a steel core that forms the spring cavity 605. Such contact between the two steel cores is not desirable and should be avoided since the contact may damage the steel cores. To avoid such contact, the dimensions of the steel core, that are used to form the spring cavity 605 of the plug body 410 should be modified such that there is no contact between the steel cores during the mold operation.

Figure 7A:
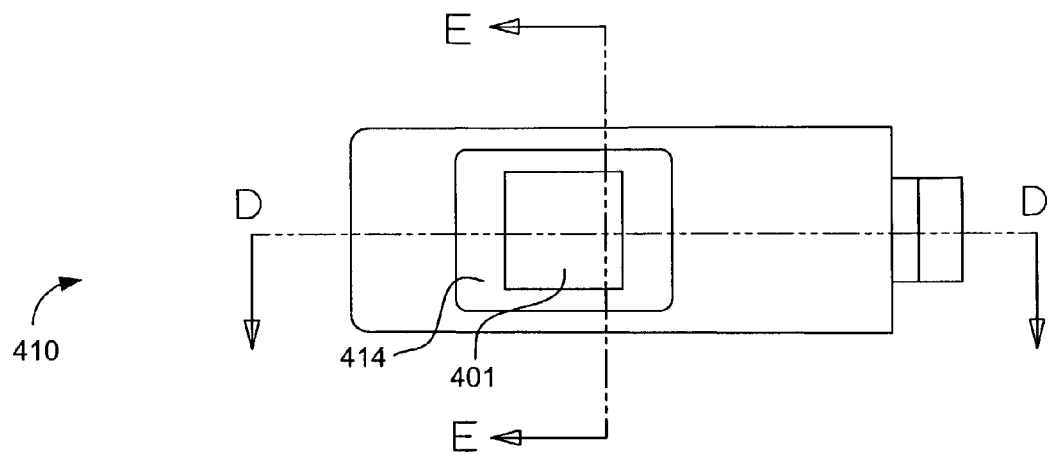
FIG. 7A shows a bottom view of another embodiment of the connector of the connector system of FIG. 5A.
Figure 7B:
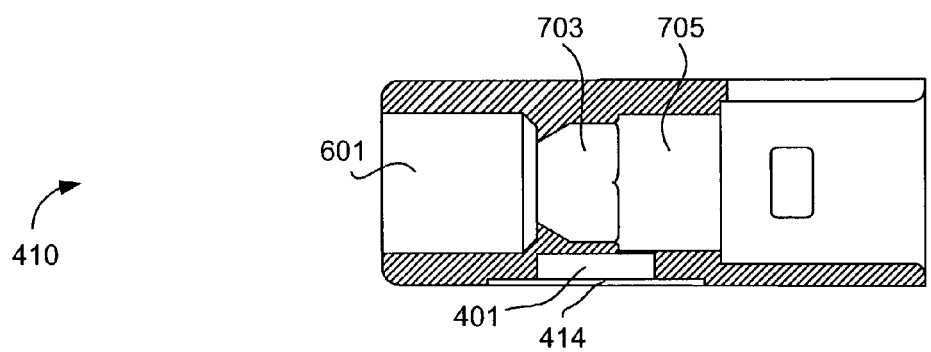
FIG. 7B shows a cross-section of the other embodiment of the connector of the connector system of FIG. 5A.
Figure 7C:
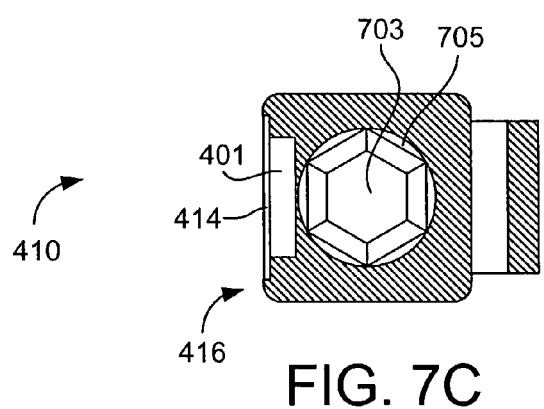
FIG. 7C shows another cross-section of the other embodiment of the connector of the connector system of FIG. 5A.

FIG. 7A shows a bottom view of another embodiment of the plug body 410 of the connector 150 (FIGS. 1–3, 5A–5B) with the cavities 401 and 414. FIG. 7B shows a cross-section D—D (FIG. 7A) of the plug body 410 of FIG. 7A. The plug body 410 comprises the ferrule cavity 601, a barrel cavity 703, a spring cavity 705, and the cavities 401 and 414. FIG. 7C shows a cross-section E—E (FIG. 7A) of the plug body 410 of the connector 150 (FIGS. 1–3, 5A–5B). The steel core that forms the spring cavity 605 (FIGS. 6B–6C) should be modified to form a steel core that forms the spring cavity 705. The spring cavity 705 has such dimensions that during the mold operation, there is no contact between the steel core that forms the cavity 401 and a steel core that forms the spring cavity 705. For instance, to integrate an MEY-1001 2.5 mm×2.5 mm chip into the cavity 414 and to avoid contact between the steel core that forms the cavity 414 with the steel core that forms the spring cavity 705, the diameter of the spring cavity should be 3.00 mm and depth of the cavity 414 should be 0.13 mm. It is noted that dimensions, such as diameter, of the barrel cavity 703 should be reduced if the dimensions of the spring cavity 705 are reduced to avoid the contact since the barrel cavity 703 cannot have bigger dimensions than the dimensions of the spring cavity 705. For example, if the diameter of the spring cavity is reduced to 3 mm, the diameter of the barrel cavity 703 should be at most 3 mm. However, the dimensions of the barrel cavity 703 cannot be reduced so that a barrel (not shown) does not move freely inside the barrel cavity 703. Moreover, a spring (not shown), such as a spring with a maximum diameter of 0.116 mm, should be able to move freely in the spring cavity 705.

Figure 8E:
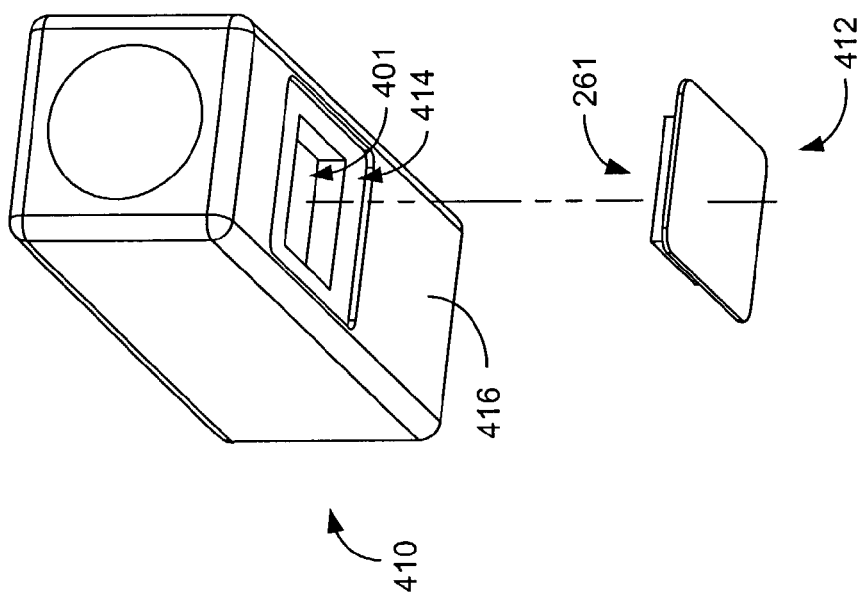

FIGS. 8A–8E show an embodiment of a method for developing the connector system 400 of FIGS. 4A and 4B, and the connector system 500 of FIGS. 5A and 5B. In FIG. 8A, the integrated circuits 261, 263, and 265 are placed on an adhesive surface 821 of an adhesive tape 801. The surface 821 has a strong adhesive, such as a pressure-sensitive permanent adhesive, to form a strong bond between the tape 801 and each integrated circuit 261, 263 and 265. After placing the integrated circuits on the adhesive tape 801, bottom surfaces 841, 843 and 845 of the integrated circuits adhere to the surface 821 of the tape 801. The tape 801 has perforations 805, 807 and 842, that surround integrated circuits 261, 263 and 265, respectively, and utility of the perforations is described below. The tape 801 can be transparent or colored. Advantages of a colored tape were described above. The tape 801 is made of a sturdy material, such as, for example polyimide or polyester. Examples of polyimide and polyester materials were provided above. Advantages of such a sturdy material were also described above.

In FIG. 8B, another adhesive tape 803 with an adhesive on a surface 823, is placed on a top surface 847 of the integrated circuit 261, a top surface 851 of the integrated circuit 263, and a top surface 853 of the integrated circuit 265. The adhesive on the surface 823 forms a weak bond with the surface 847 of the integrated circuit 261 and is such that the tape 803 can be removed as explained below in FIG. 8D. The tape 801 is placed to cover the integrated circuits 261, 263 and 265, and portions 825–831 of the tape 801, as shown in FIGS. 8C and 8D. Providing a cover to the integrated circuits 261, 263 and 265, and the portions 825–831, protects the integrated circuits as well as the portions from the various sources such as environmental conditions and contact with the hands of the user. When an integrated circuit, such as, for example, the integrated circuit 261 is to be integrated into the plug body 410 (FIGS. 4A, 4B, 5A, 5B) of the connector 150 (FIGS. 5A, 5B), the tape 803 is removed as shown in FIG. 8D. The tape 801 is torn at the perforations 805 to separate the tape 412 that is adhered to the integrated circuit 261, from the tape 801. After separating the tape 412, as shown in FIG. 8E, the tape 412 is adhered to the cavity 414 of the plug body 410 to integrate the integrated circuit into the plug body 410 of the connector 150.

The tape 801 may not have the perforations 805, 807 and 842. However, the perforations 805, 807 and 842, are for convenience of ease of separation of portions of the tape 801. As an illustration, the tape 412 can be easily separated at the perforations 805, from the tape 801 to integrate the integrated circuit 261 into the plug body 410 of the connector 150.

An alternative embodiment of the method for developing a connector system uses insert molding to integrate the integrated circuit 261 in a surface, such as the surface 416, of the connector 150. The integrated circuit 261 is insert-molded in the surface of the connector 150 so that the integrated circuit 261 lies in a cavity, such as the cavity 401, in the surface of the connector 150.

In yet another alternative embodiment of the method, the integrated circuit 261 can be integrated in the surface of the connector 150 by insert-molding the integrated circuit 261 in a plastic carrier (not shown) and then snapping the integrated circuit 261 in the cavity. The plastic carrier protects the integrated circuit 261 from damage that can be caused by the various sources that are mentioned above. In still another embodiment, the integrated circuit 261 can be integrated in the surface of the connector 150 by insert-molding the integrated circuit 261 in the plastic carrier and then ultrasonically welding the plastic carrier to the cavity. In an alternative embodiment of the method, a material, such as a potting compound or glue, can be used to integrate the integrated circuit 261 in the cavity of the connector 150.

The method allows the integrated circuit 261 to be integrated in a surface of the connector 150 after assembling the connector 150 with a fiber optic product. Examples of fiber optic products include optical fiber jumpers, fiber optic ribbons, fiber optic fanouts and multi-fiber cables. Integrating the integrated circuit 261 in the surface of the connector 150 before finishing assembly of the connector 150 with the fiber optic product may result in a waste of the fiber optic product, the connector 150 and the integrated circuit 261. Reason for the waste is that the fiber optic product may be found to be inoperative after integrating the integrated circuit 261 and so a combination of the fiber optic product, the connector 150 and the integrated circuit 261, may be discarded. The method avoids such waste by allowing the integrated circuit 261 to be integrated in the surface of the connector 150 after assembling the connector 150 with the fiber optic product.

The present disclosure also relates to adapter systems and methods for developing the adapter systems. FIG. 9A shows an embodiment of an adapter system 900. The adapter system 900 comprises a portion 902, for instance, a receptacle, of the adapter 130 (FIGS. 1, 2 and 3) and a cavity 901 formed on a surface 579 of the portion 902 of the adapter 130, in which the antenna 281 can be integrated. Examples of adapters include, but are not limited to one-port receptacles, simplex adapters, multi-port receptacles, duplex adapters, multi-port adapters, hybrid adapters, adapters that can be coupled to FC™ connectors, adapters that can be coupled to SC™ connectors, adapters that can be coupled to ST™ connectors, adapters that can be coupled to LC™ connectors, adapters that can be coupled to MU™ connectors and adapters that can be coupled to MT™ connectors. The antenna 281 is integrated into the surface 579 of the portion 902 of the adapter 130 by placing the integrated circuit into the cavity 901 and then placing a tape 912 in a cavity 914 formed on the surface 579. Alternatively, the antenna 281 can be bonded to the surface 579 of the adapter 130 by using an adhesive. Moreover, it is noted that preferably, the shape of the cavity 901 conforms to the shape of the antenna 281 and the antenna 281 can be of any shape, such as, for instance, circular, triangular, rectangular, hexagonal or square. It is also noted that preferably, the shape of the cavity 914 conforms to the shape of the tape 912 and the tape 912 can be of any one of the shapes mentioned above.

The tape 912 holds the antenna 281 in the cavity 901 because the tape 912 strongly adheres to the cavity 914. An adhesive, such as, for instance, a pressure-sensitive permanent adhesive, on a surface 918 of the tape 912 helps to form a strong bond between the cavity 914 and the surface 918 of the tape 912 so that the tape 912 can strongly adhere to the cavity 914.

The tape 912 is made of sturdy material, such as, for example, polyimide or polyester, to protect the antenna 281 from damage from the various sources mentioned above. Examples of polyimide and polyester materials were provided above. The tape 912 can be transparent or colored. Colored tapes can help identify a coupling of two adapters. As an illustration, a blue colored tape on the surface 579 of the portion 902 of the adapter 130 and a blue colored tape on a surface of a portion of the adapter 132 (FIGS. 1–2) helps identify that the adapters 130 and 132 are coupled to each other. Moreover, the tape can be a label that displays information, such as, for instance, identification number of the antenna 281 or name of manufacturer of the antenna 281.

In an alternative embodiment, the antenna 281 can be integrated into the portion 902 of the adapter 130 without being held by the tape 912. For example, the antenna 281 can be integrated into the surface 579 of the portion 902 of the adapter 130, by using a fastener, such as, for example, glue or screws. Nevertheless, without placing the tape 912 in the cavity 914 to hold the antenna 281 in the cavity 901, the antenna 281 is exposed to damage from the various sources. It is noted that it is not necessary to form the cavity 914 if a user does not intend to use the tape 912 to integrate the antenna 281 into the surface 579. In another alternative embodiment, the antenna 281 can be integrated into the surface 579 of the portion 902 of the adapter 130 by using the tape 912 in addition to the fastener to provide a stronger hold to the antenna 281 than that provided solely by the tape 912. In yet another alternative embodiment, the antenna 281 can be placed on the surface 579 of the portion 902 of the adapter 130 and then the tape 912 can be placed over the antenna 281. In such an embodiment, there is no need to form the cavities 901 and 914 since the antenna 281 is held on the surface 579 with the help of the tape 912. In such an embodiment, the antenna 281 can be coupled to the intermediate device 104 (FIGS. 1, 2 and 3) via discrete leads, such as wires. The discrete leads can be coupled to the intermediate device 104 through a panel or a shelf, on which an adapter that comprises the antenna 281, is located and that serves as a printed wiring board (not shown).

FIG. 9B shows another embodiment of the adapter system 900. The adapter system 900 comprises the portion 902 of the adapter 130 (FIGS. 1, 2 and 3) in which the antenna 281 (FIG. 9A) is integrated with the help of the tape 912.

FIG. 9C shows yet another embodiment of an adapter system 900 that comprises the portion 902 of the adapter 130 (FIGS. 1, 2 and 3) in which the antenna 281 is integrated. The antenna 281 is integrated in an outside wall 931 of the surface 579 of the portion 902 of the adapter 130. FIG. 9D shows another embodiment of an adapter system 900 in which the antenna 281 is integrated in an inside wall 933 of the surface 579 of the portion 902 of the adapter 130.

Figure 10A:
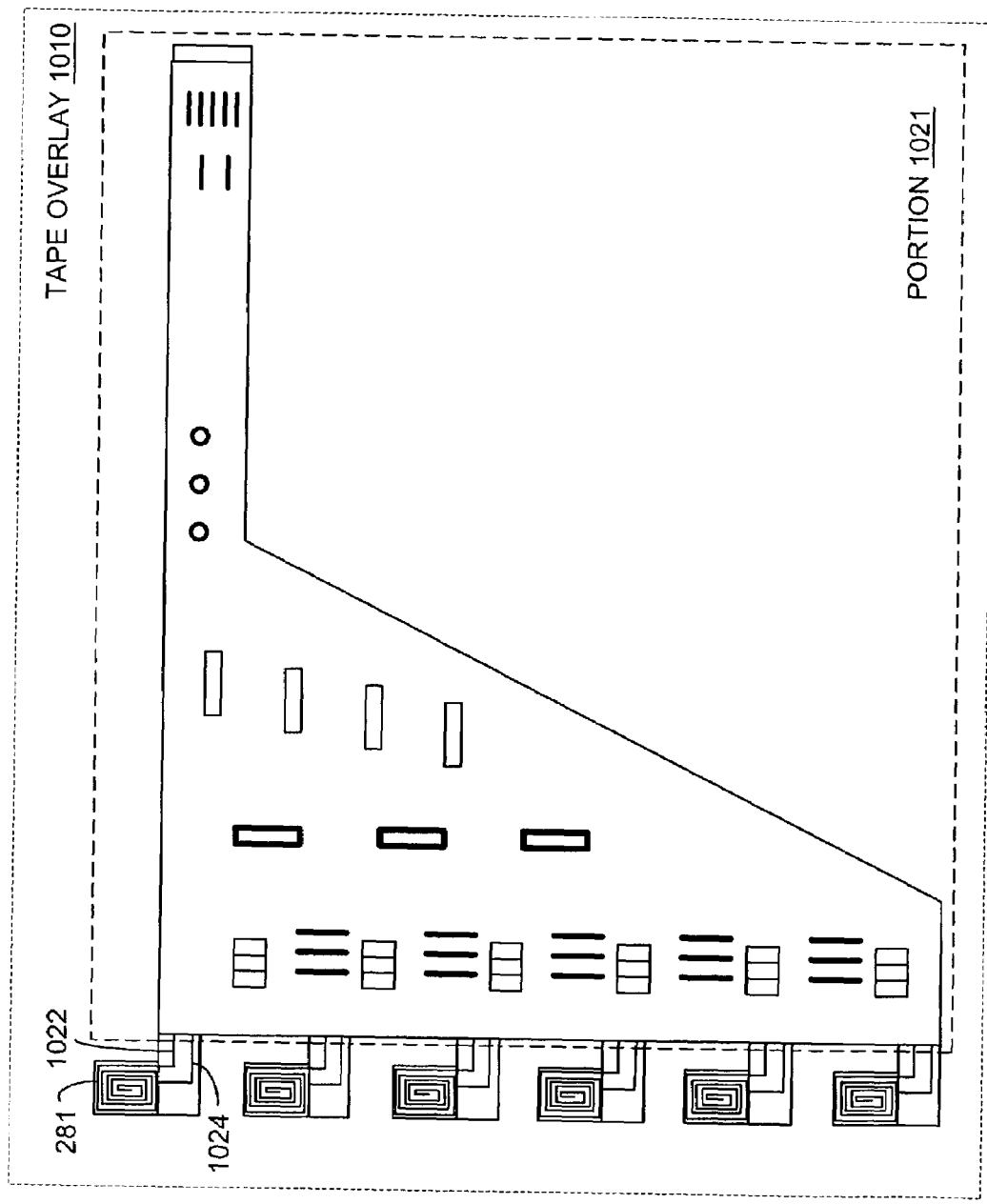
FIGS. 10A and 10B show an embodiment of an adapter system comprising an adapter to which an antenna that is embedded in a tape overlay, is affixed.
Figure 10B:
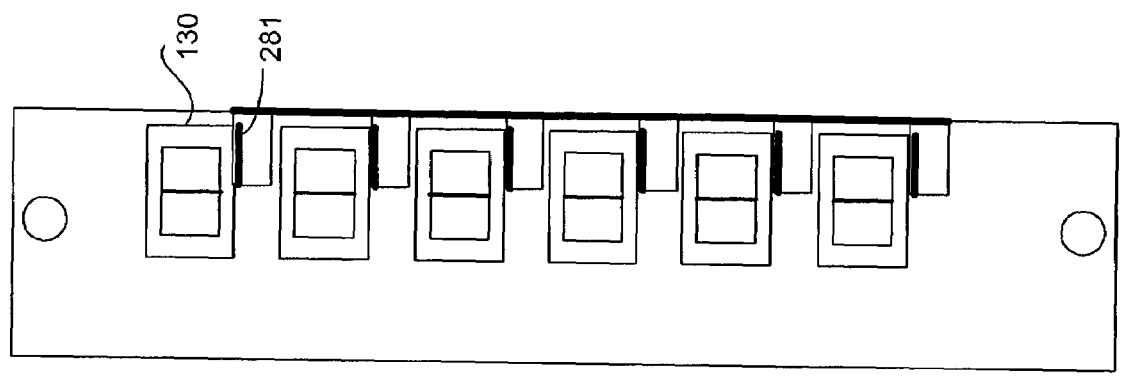

FIGS. 10A and 10B show an embodiment of an adapter system. The adapter system comprises a tape overlay 1010 having antennas, such as the antenna 281, that are embedded in the tape overlay 1010. As described below, the adapter system also comprises adapters. Each antenna, such as the antenna 281, in the tape overlay 1010, has leads, for instance, leads 1022 and 1024, that couple the antenna to a portion 1021 of an intermediate device, such as the intermediate device 104 (FIG. 2). The antennas communicate with the intermediate device via their respective leads. As shown in FIG. 10B, each antenna, such as the antenna 281, is affixed to an adapter, such as, the adapter 130. Each antenna is affixed to an adapter by using an adhesive, which is on portions of the tape overlay 1010 (FIG. 10A) that comprise an antenna. When a connector, for instance, the connector 150 (FIG. 2), couples to the adapter 130, there is communication between an integrated circuit integrated in a surface of the connector and the antenna of the adapter.

Figure 11C:
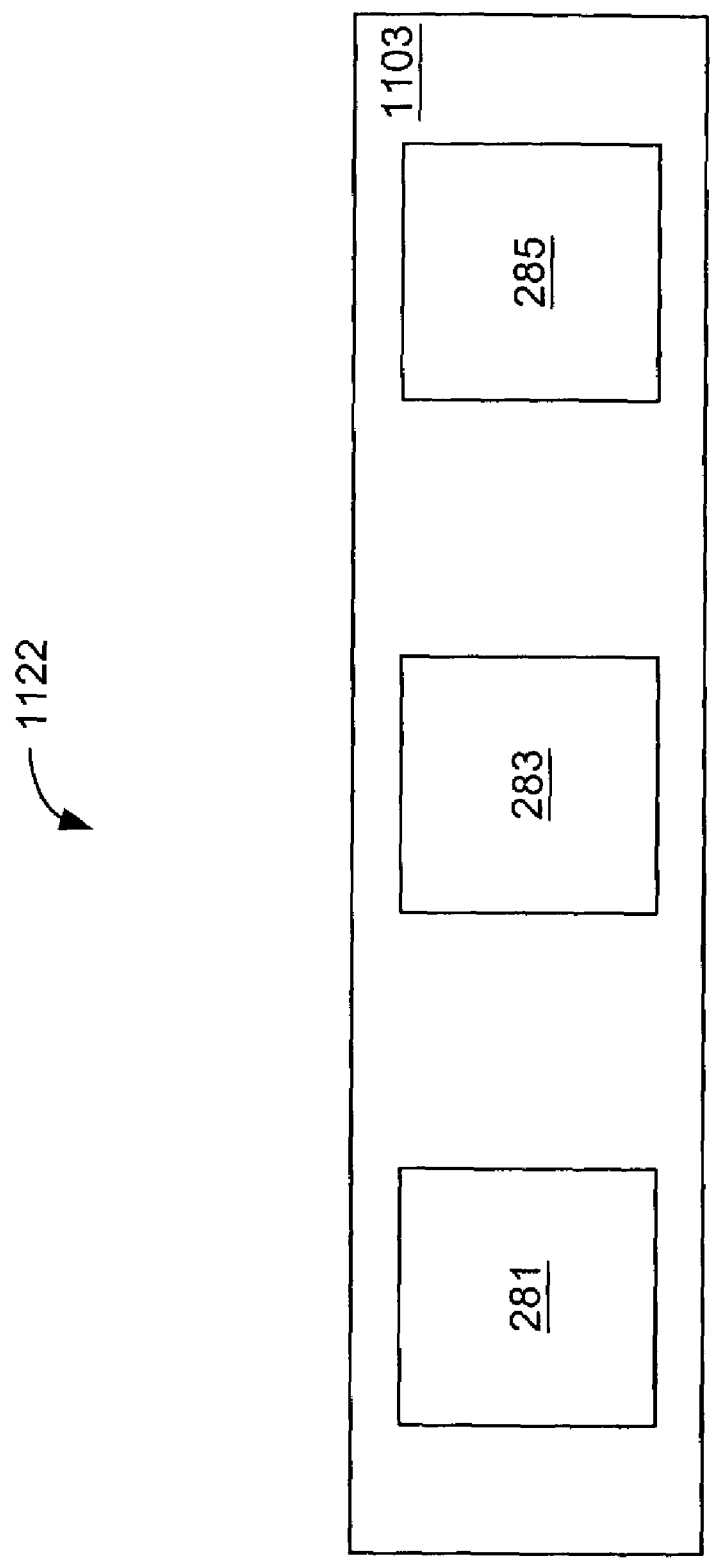

FIGS. 11A–11C show an embodiment of a method for developing the adapter system of FIGS. 10A and 10B. In FIG. 11A, the antennas 281, 283, and 285 are placed on an adhesive surface 1121 of an adhesive tape 1101. Each of the antennas 281, 283 and 285 has leads, such as the leads 1022 and 1024 (FIG. 10A) that couple to a portion, such as the portion 1021 (FIG. 10A), of an intermediate device, for example the intermediate device 104. The leads and the portion of the intermediate device are also placed on the adhesive surface 1121 of the adhesive tape 1101. The surface 1121 has a strong adhesive, such as a pressure-sensitive permanent adhesive, to form a strong bond between the tape 1101 and each antenna 281, 283 and 285. After placing the antennas, the leads and the portion, on the adhesive tape 1101, bottom surfaces 1141, 1143 and 1145 of the antennas, the leads and the portion, adhere to the surface 1121 of the tape 1101. The tape 1101 can be transparent or colored. Advantages of a colored tape were described above. The tape 1101 is made of a sturdy material, such as, for example, polyimide or polyester. Examples of polyimide and polyester materials were provide above. Advantages of such a sturdy material were also described above.

In FIG. 11B, another adhesive tape 1103 with an adhesive on a surface 1123, is placed on a top surface 1147 of the antenna 281, a top surface 1151 of the antenna 283, and a top surface 1153 of the antenna 285, the leads and the portion to form an assembly 1122, which is shown in FIG. 11C. The adhesive on the surface 1123 is such that the tape 1103 serves to laminate the antennas 281, 283 and 285, the leads, and the portion of intermediate device 104. The tape 1101 is placed to cover the antennas 281, 283 and 285, the leads, the portion and portions 1125–1131 of the tape 1101, as shown in FIG. 11C. Providing a cover to the antennas 281, 283 and 285, the leads, the portion of the intermediate device 104 and the portions 1125–1131, protects the antennas, the leads, the portion of the intermediate device 104 and the portions 1125–1131, from the various sources, such as environmental conditions and contact with the hands of the user. When an integrated circuit, such as, for example, the antenna 281 is to be integrated into the surface 579 (FIG. 9A) of the adapter 130, the assembly 1122 is diecut to a particular shape, such as, the shape of the tape overlay 1010 (FIG. 10A), and is bonded with an additional adhesive strip (not shown) to adapters, such as the adapter 130 (FIG. 10B) of a panel. For example, a portion of the assembly 1122, that comprises the antenna 281 is bonded to the adapter 130, as shown in FIG. 10B.

An alternative embodiment of the method for developing an adapter system uses insert molding to integrate the antenna 281 in a surface, such as the surface 579, of the adapter 130. The antenna 281 is insert-molded in the surface of the adapter 130 so that the antenna 281 lies in a cavity, such as the cavity 901, in the surface of the portion 902 of the adapter 130. In yet another alternative embodiment of the method, the antenna 281 can be integrated in the surface of the portion 902 of the adapter 130 by insert-molding the antenna 281 in a plastic carrier (not shown) and then snapping the antenna 281 in the cavity 901. The plastic carrier protects the antenna 281 from damage that can be caused by the various sources that are mentioned above. In still another embodiment, the antenna 281 can be integrated in the surface of the portion 902 of the adapter 130 by insert-molding the antenna 281 in the plastic carrier and then ultrasonically welding the plastic carrier to the cavity. In an alternative embodiment of the method for developing an adapter system, a material, such as a potting compound or glue, can be used to integrate the antenna 281 in the cavity of the adapter 130.

It should be emphasized that the above-described embodiments of the self-registration systems and methods for dynamically updating information related to a network, particularly, any "preferred" embodiments, are merely possible examples of implementations, merely set forth for a clear understanding of the principles behind the systems and methods. Many variations and modifications may be made to the above-described embodiment(s) of the systems and methods without departing substantially from the spirit and principles of the invention. All such modifications and variations are intended to be included herein within the scope of this disclosure and protected by the following claims.

The invention claimed is:

1. A self-registration system for dynamically updating information related to a network, comprising:
 a connector comprising an integrated circuit that stores a first block of information;
 an adapter coupled to the connector;
 a reader that receives the first block of information from the integrated circuit via the adapter; and
 a communication line coupled to the adapter via the connector, wherein the first block of information stored on the integrated circuit comprises a first block of information about network elements associated with the integrated circuit, and wherein the first block of information about network elements associated with the integrated circuit comprises information other than information identifying the connector, the adapter, the communication line and the integrated circuit;

a computing device that receives the first block of information from the reader and stores the first block of information; and a writer that receives a second block of information from the computing device and wherein the writer transmits the second block of information via the adapter to the integrated circuit which stores the received second block of information.

2. The system of claim 1, wherein the first block of information about network elements associated with the integrated circuit comprises at least one of a first block of information about the integrated circuit, the reader, the communication line, the connector, the adapter, a panel comprising the adapter, a shelf comprising the panel, and a bay comprising the shelf.

3. The system of claim 1, wherein the connector is one of FC™ connector, LC™ connector, SC™ connector, ST™ connector, MU™ connector and MT™ connector.

4. The system of claim 1, wherein the adapter comprises an antenna that acts as a medium by which the second block of information is transmitted from the writer to the integrated circuit.

5. The system of claim 1, further comprising a wired electrical connection that acts as a medium by which the writer transmits the second block of information to the integrated circuit.

6. The system of claim 1, wherein the second block of information comprises a second block of information about network elements associated with the integrated circuit, wherein the second block of information about network elements associated with the integrated circuit comprises at least one of a second block of information about the integrated circuit, the reader, the writer, the computing device, the communication line, the connector, the adapter, the panel, the shelf, and the bay.

7. A self-registration system for dynamically updating information related to a network, comprising:

a connector comprising an integrated circuit that stores a first block of information;

an adapter coupled to the connector;

a reader that receives the first block of information from the integrated circuit via the adapter; and a communication line coupled to the adapter via the connector, wherein the first block of information comprises at least one of types and rates of signals propagating through the communication line, operating wavelengths of the signals, types of fibers of the communication line, span measurements of the communication line, number of times the communication line is coupled to the adapter via the connector, type of the connector, length of the communication line, type of the communication line, dimensions of a panel comprising the adapter, type of the adapter, number of adapters in the panel, dimensions of a shelf comprising the panel, number of panels in the shelf, number of adapters in the shelf, fiber count of the communication line and number of communication lines coupled to the adapter.

8. The system of claim 7, further comprising a computing device that receives the first block of information from the reader to store the first block of information.

9. The system of claim 8, further comprising a writer that receives a second block of information from the computing device, wherein the writer transmits the second block of information via the adapter to the integrated circuit, and wherein the integrated circuit stores the second block of information.

10. The system of claim 9, wherein the second block of information comprises at least one name of the connector, name of the integrated circuit, name of the adapter, name of the reader, name of the writer, name of the communication line, name of the computing device, location of the connector in the network, location of the integrated circuit in the network, location of the adapter in the network, location of the reader in the network, location of the writer in the network, location of the communication line in the network, location of the computing device in the network, types and rates of signals propagating through the communication line, operating wavelengths of the signals, identification number of each end of the communication line, types of fibers of the communication line, span measurements of the communication line, identification number of the integrated circuit, whether the adapter is coupled to the communication line via the connector, whether the reader is coupled to the integrated circuit via the adapter, number of times the communication line is coupled to the adapter via the connector, identification number of the reader, identification number of the writer, type of the connector, length of the communication line, identification number of the panel, dimensions of the panel, number of adapters in the panel, dimensions of the shelf, identification number of the shelf, number of panels in the shelf, fiber count of the communication line and number of communication lines coupled to the adapter.

11. The system of claim 9, wherein the connector is one of FC™ connector, LC™ connector, SC™ connector, ST™ connector, MU™ connector, and MT™ connector.

12. The system of claim 7, wherein the connector is one of FC™ connector, LC™ connector, SC™ connector, ST™ connector, MU™ connector, and MT™ connector.

13. A self-registration method for dynamically updating information related to a network, comprising:

coupling an adapter to a connector comprising an integrated circuit;

transmitting a first block of information stored on the integrated circuit to a reader via the adapter; and coupling a communication line to the adapter via the connector, wherein the transmitting the first block of information comprises transmitting a first block of information about network elements associated with the integrated circuit, and wherein transmitting the first block of information about network elements associated with the integrated circuit comprises transmitting information other than information identifying the connector, the adapter, the communication line and the integrated circuit, wherein transmitting the first block of information about network elements associated with the integrated circuit comprises transmitting at least one of a first block of information about the integrated circuit, the reader, the communication line, the connector, the adapter, a panel comprising the adapter, a shelf comprising the panel and a bay comprising the shelf;

transmitting the first block of information to a computing device and storing it therein; and transmitting a second block of information from the computing device to a writer; and transmitting the second block of information from the writer to the integrated circuit via the adapter and storing the information therein.

14. The method of claim 13, wherein the coupling the adapter to the connector is coupling the adapter to one of FC™ connector, LC™ connector, SC™ connector, ST™ connector, MT™ connector.

15. The method of claim 13, wherein the further transmitting comprises further wirelessly transmitting the second block of information from the writer to the integrated circuit.

16. The method of claim 13, wherein the further transmitting comprises further transmitting the second block of information from the writer to the integrated circuit via a wired electrical connection.

17. The method of claim 13, wherein the transmitting comprises transmitting a second block of information about network elements associated with the integrated circuit.

18. The method of claim 17, wherein transmitting the second block of information about network elements associated with the integrated circuit comprises transmitting at least one of a second block of information about the integrated circuit, the reader, the writer, the computing device, the communication line, the connector, the adapter, the panel, the shelf and the bay.

19. A self-registration method for dynamically updating information related to a network, comprising:
coupling an adapter to a connector comprising an integrated circuit;
transmitting a first block of information stored on the integrated circuit to a reader via the adapter; and
coupling a communication line to the adapter via the connector, wherein transmitting the first block of information comprises transmitting at least one of types and rates of signals propagating through the communication line, operating wavelengths of the signals, types of fibers of the communication line, span measurements of the communication line, number of times the communication line is coupled to the adapter via the connector, type of the connector, length of the communication line, type of the communication line, dimensions of a panel comprising the adapter, type of the adapter, number of adapters in the panel, dimensions of a shelf comprising the panel, number of panels in the shelf, fiber count of the communication line and number of communication lines coupled to the adapter.

20. The method of claim 19, further comprising:
receiving the first block of information from the reader; and
storing the first block of information on a computing device.

21. The method of claim 20, further comprising:
transmitting a second block of information from the computing device to a writer;
further transmitting the second block of information from the writer via the adapter to the integrated circuit; and
storing the second block of information on the integrated circuit.

22. The method of claim 21, wherein transmitting the second block of information comprises transmitting at least one of name of the connector, name of the integrated circuit, name of the adapter, name of the reader, name of the writer, name of the communication line, name of the computing device, location of the connector in the network, location of the integrated circuit in the network, location of the adapter in the network, location of the reader in the network, location of the writer in the network, location of the communication line in the network, location of the computing device in the network, types and rates of signals propagating through the communication line, operating wavelengths of the signals, identification number of each end of the communication line, types of fibers of the communication line, span measurements of the communication line, identification number of the integrated circuit, whether the adapter is coupled to the communication line via the connector, whether the reader is coupled to the integrated circuit via the adapter, number of times the communication line is coupled to the adapter via the connector, identification number of the reader, identification number of the writer, type of the connector, length of the communication line, identification number of the panel, dimensions of the panel, number of adapters in the panel, dimensions of the shelf, identification number of the shelf, number of panels in the shelf, fiber count of the communication line and number of communication lines coupled to the adapter.

23. The method of claim 21, wherein coupling the adapter to the connector comprises coupling the adapter to one of FC™ connector, LC™ connector, SC™ connector, ST™ connector, MU™ connector, and MT™ connector.

24. The method of claim 19, wherein coupling the adapter to the connector comprises coupling the adapter to one of FC™ connector, LC™ connector, SC™ connector, ST™ connector, MU™ connector, and MT™ connector.

25. A self-registration system for dynamically updating information related to a network, comprising:
means for connecting comprising an integrated circuit that stores a first block of information;
means for adapting coupled to the means for connecting;
means for reading that receives the first block of information from the integrated circuit via the means for adapting; and
means for communicating coupled to the means for adapting via the means for connecting, wherein the first block of information comprises a first block of information about network elements associated with the integrated circuit, and wherein the first block of information about network elements associated with the integrated circuit comprises information other than information identifying the means for connecting, the means for adapting, the means for communicating and the integrated circuit, wherein the first block of information about network elements associated with the integrated circuit comprises at least one of a first block of information about the integrated circuit, the means for reading, the means for communicating, the means for connecting, the means for adapting, a panel comprising the means for adapting, a shelf comprising the panel, and a bay comprising the shelf.

26. A self-registration system for dynamically updating information related to a network, comprising:
a connector comprising an integrated circuit that stores a first block of information;
an adapter coupled to the connector;
a reader that receives the first block of information from the integrated circuit via the adapter; and
a communication line coupled to the adapter via the connector, wherein the first block of information comprises a first lock of information about network elements associated with the integrated circuit, and wherein the first block of information about network elements associated with the integrated circuit comprises information other than information identifying the connector, the adapter, the communication line and the integrated circuit;
the first block of information about network elements associated with the integrated circuit comprises at least one of a first block of information about the integrated circuit, the reader, the communication line, the connector, the adapter, a panel comprising the adapter, a shelf comprising the panel, and a bay comprising the shelf; and wherein the first block of information about the integrated circuit comprises a least one of name of the integrated circuit and location of the integrated circuit in the network, wherein the first block of information about the reader comprises at least one of name of the reader and location of the reader in a network, wherein the first block of information about the communication line comprises at least one of types of signals propagating through the communication line, rates of the signals, wavelengths of the signals and types of fibers in the communication line, wherein the fist block of information about the connector comprises at least one of name of the connector and type of the connector, wherein the first block of information about the adapter comprises at least one of name of the adapter and type of the adapter, wherein the first block of information about the panel comprises at least one of dimensions of the panel and number of adapters in the panel, wherein the first block of information about the shelf comprises at least one of number of panels in the shelf and dimensions of the shelf, and wherein the first block of information about the bay comprises at least one of name of the bay and location of the bay in the network.

27. A self-registration system for dynamically updating information related to a network, comprising:
    a connector comprising an integrated circuit that stores a first block of information;
    a reader that receives the first block of information from the integrated circuit via the adapter; and
    a communication line coupled to the adapter via the connector, wherein the first block of information comprises a first block of information about network elements associated with the integrated circuit, and wherein the first block of information about network elements associated with the integrated circuit comprises information other than information identifying the connector, the adapter, the communication line and the integrated circuit;
    the system further comprising a computing device that receives the first block of information from the reader to store the first block of information;
    the system further comprises a writer that receives a second block of information from the computing device, wherein the writer transmits the second block of information via the adapter to the integrated circuit, and wherein the integrated circuit stores the second block of information received from the writer, wherein the second block of information comprises a second block of information about network elements associated with the integrated circuit and comprises at least one of a second block of information about the integrated circuit, the reader, the writer, the computing device, the communication line, the connector, the adapter, the panel, the shelf, and the bay; and
    wherein the second block of information about the integrated circuit comprises at least one of name of the integrated circuit and location of the integrated circuit in the network, wherein the second block of information about the reader comprises at least one of name of the reader and location of the reader in the network, wherein the second block of information about the writer comprises at least one of name of the writer and location of the second block of information about the computing device comprises at least one of name of the computing device and location of the computing device in the network, wherein the second block of information about the communication line comprises at least one of types of signals propagating through the communication line, rates of the signals, wavelengths of the signals and types of fibers in the communication line, wherein the second block of information about the connector comprises at least one of name of the connector and type of the connector, wherein the second block of information about the adapter comprises at least one of name of the adapter and type of the adapter, wherein the second block of information about the panel comprises at least one of dimensions of the panel and number of adapters in the panel, wherein the second block of information about the shelf comprises at least one of number of panels in the shelf and dimensions of the shelf, and wherein the second block of information about the bay comprises at least one of name of the bay and location of the bay in the network.

28. A self-registration system for dynamically updating information related to a network comprising:
    a writer that receives information from a computing device;
    an adapter;
    a connector coupled to the adapter, the connector comprising:
    an integrated circuit that receives the information from the writer via the adapter and stores the information, and
    a communication line that is coupled to the adapter via the connector, wherein the information comprises information abut network elements associated with the integrated circuit, wherein the information about network elements associated with the integrated circuit comprises at least one of information about the integrated circuit, the writer, the computing device, the communication line, the connector, the adapter, a panel comprising the adapter, a shelf comprising the panel and a bay comprising the shelf;
    wherein the information about the integrated circuit comprises at least one of name of the integrated circuit and location of the integrated circuit in the network, wherein the information about the writer comprises at least one of name of the writer and location of the writer in the network, wherein the information about the computing device comprises at least one of name of the computing device and location of the computing device in the network, wherein the information about the communication line comprises tat least one of types of signals propagating through the communication, rates of the signals, wavelengths of the signals and types of fibers in the communication line, wherein the information about the connector comprises at least one of name of the connector and type of the connector, wherein the information about the adapter comprises at least one of name of the adapter and type of the adapter, wherein the information about the panel comprises at least one of dimensions of the panel and number of adapters in the panel, wherein the information about comprises at least one of number of panels in the shelf and dimensions of the shelf and wherein the information about the bay comprises at least one of name of the bay and location of the bay in the network.

29. A self-registration system for dynamically updating information related to a network, comprising:
    a writer that receives the information from a computing device;

an adapter;

a connector coupled to the adapter, the connector comprising:

an integrated circuit that receives the information from the writer via the adapter and stores the information; and a communication line that is coupled to the adapter via the connector, wherein the information comprises as least one of name of the connector, name of the integrated circuit, name, name of the adapter, name of the writer, name of the communication line, name of the computing device, location of the connector in the network, location of the integrated circuit in the network, location of the adapter in the network, location of the writer in the network, location of the communication line in the network, location of the computing device in the network, types and rates of signals propagating through the communication line, operating wavelengths of the signals, identification number of each end of the communication line, types of fibers in the communication line, span measurements of the communication line, identification number of the integrated circuit, whether the adapter is coupled to the communication line via the connector, whether the writer is coupled to the integrated circuit via the adapter, number of times the communication line is coupled to the adapter via the connector, identification number of the writer, type of connector, length of the communication line, type of the communication line, identification number of a panel comprising the adapter, dimensions of the panel, number of adapters in the panel, types of adapters in the panel, dimensions of a shelf comprising the panel, identification number of the shelf, number of panels in the shelf, number of adapters in the shelf, fiber count of the communication line and number of communication lines coupled to the adapter.

30. The system of claim 29 wherein the connector is one of FC™ connector, LC™ connector, SC™ connector, ST™ connector, MU™ connector and MT™ connector.

31. A self-registration method for dynamically updating information related to a network, comprising:

coupling an adapter to a connector comprising an integrated circuit;

transmitting a first block of information stored on the integrated circuit to a reader via the adapter;

coupling a communication lien to the adapter via the connector, wherein transmitting the first block of information comprises transmitting a first block of information about network elements associated with the integrated circuit, and wherein transmitting the first block of information about network elements associated with the integrated circuit comprises transmitting information other than information identifying the connector, the adapter, the communication line and the integrated circuit;

wherein transmitting the first block of information about network elements associated with the integrated circuit comprises transmitting at least one of a first block of information about the integrated circuit, the reader, the communication line, the connector, the adapter, a panel comprising the adapter, a shelf comprising the panel and a bay comprising the shelf;

wherein transmitting the first block of information about the integrated circuit comprises transmitting at least one of name of the integrated circuit and location of the integrated circuit in the network, wherein transmitting the first block of information about the reader comprises transmitting at least one of name of the reader and location of the reader in the network, wherein transmitting the first block of information about the communication line comprises transmitting at least one of types of signals propagating through the communication line, rates of the signals, wavelengths of the signals and types of fibers in the communication line, wherein transmitting the first block of information about the connector comprises transmitting a least one of name of the connector and type of the connector, wherein transmitting the first block of information about the adapter comprises transmitting at least one of name of the adapter and type of the adapter, wherein transmitting the first block of information about the panel comprises transmitting at least one of dimensions of the panel and number of adapters in the panel, wherein transmitting the first block of information about the shelf comprises transmitting at least one of number of panels in the shelf and dimensions of the shelf, and wherein transmitting the first block of information about the bay comprises transmitting at least one of name of the bay and location of the bay in the network.

32. A self-registration method for dynamically updating information related to a network, comprising:

coupling an adapter to a connector comprising an integrated circuit;

transmitting a first block of information stored on the integrated circuit to a reader via the adapter;

coupling a communication line to the adapter via the connector, wherein transmitting of the first block of information about network elements associated with the integrated circuit, and wherein transmitting the first block of information about the network elements associated with the integrated circuit comprises transmitting information other than information identifying he connector, the adapter, the communication line and the integrated circuit; and further comprising:

receiving the first block of information from the reader, and storing the first block of information on a computing device;

transmitting a second block of information from the computing device to a writer;

further transmitting the second block of information from the writer via the adapter to the integrated circuit and storing the second block of information on the integrated circuit, wherein the transmitting comprises transmitting a second block of information about network elements associated with the integrated circuit which comprises transmitting at least one of a second block of information about the integrated circuit, the reader, the writer, the computing device, the communications line, the connector, the adapter, the panel, the shelf, and the bay; and wherein transmitting the second block of information about the integrated circuit comprises transmitting at least one of name of the integrated circuit and location of the integrated circuit in the network, wherein transmitting the second block of information about the reader comprises transmitting at least one of name of the reader and location of the reader in the network, wherein transmitting the second block of information about the writer comprises transmitting at least one of name of the writer and location of the writer in the network, wherein transmitting the second block of information about the computing device comprises transmitting at least one of name of the computing device and location of the computing device in the network, where transmitting the second block of information about the communication line comprises transmitting at least one of types of signals propagating through the communication line, rates of signals, wavelengths of the signals and types of fibers in the communication line, wherein transmitting the second block of information about the connector comprises transmitting at least one of name of the connector and type of the connector, wherein transmitting the second block of information about the adapter comprises transmitting a least one of name of the adapter and type of the adapter, wherein transmitting the second block of information about the name comprises transmitting at least one of dimensions of the panel and number of adapters in the panel, wherein transmitting the second block of information about the shelf comprises transmitting at least one of number of panels in the shelf and dimensions of the shelf, and wherein transmitting the second block of information about the bay comprises transmitting at least one of name of the bay and location of the bay in the network.

33. A self-registration method for dynamically updating information related to a network, comprising:
coupling an adapter to a connector comprising an integrated circuit;
transmitting information from a computing device to a writer;
further transmitting the information from the writer via the adapter to the integrated circuit;
storing the information on the integrated circuit;
coupling the connector to a communication line, wherein the transmitting comprises transmitting information about network elements associated with the integrated circuit;
wherein transmitting the information about network elements associated with the integrated circuit comprises transmitting at least one of information about the integrated circuit, the writer, the computing device, the communication line, the connector, the adapter, a panel comprises the adapter, a shelf comprising the panel, and a bay comprising the shelf;
wherein transmitting the information about the integrated circuit comprises transmitting at least one of name of the integrated circuit and location of the integrated circuit in the network, wherein the transmitting the information about the writer comprises transmitting at least one of name of the writer and location of the writer in the network, wherein transmitting the information about the computing device comprises transmitting at least one of name of the computing device and location of the computing device in the network, wherein transmitting the information about the communication line comprises transmitting at least one of types of signals propagating through the communication line, rates of the signals, wavelengths of the signals and types of fibers in the communication line, wherein transmitting the information about the connector comprises transmitting at least one of name of the connector and type of the connector, wherein transmitting the information about the adapter comprises transmitting at least one of name of the adapter and type of the adapter, wherein transmitting the information about the panel comprises transmitting at least one of dimensions of the panel and number of adapters in the panel, wherein transmitting the information about the shelf comprises transmitting at least one of number of panels in the shelf and dimensions of the shelf, and wherein transmitting the information about the bay comprises transmitting at least one of name of the bay and location of the bay in the network.

34. A self-registration method for dynamically updating information related to a network, comprising:
coupling an adapter to a connector comprising an integrated circuit;
transmitting information from a computing device to a writer;
further transmitting the information from the writer via the adapter to the integrated circuit;
storing the information on the integrated circuit;
coupling the connector to a communication line;
wherein transmitting the information comprises transmitting at least one of name of the connector, name of the integrated circuit, name of the adapter, name of the writer, name of the communication line, name of the computing device, location of the connector in the network, location of the integrated circuit in the network, location of the adapter in the network, location of the writer in the network, location of the communication line in the network, location of the computing device in the network, types and rates of signals propagating through the communication line, operating wavelengths of the signals, identification number of each end of the communication line, types of fibers of the communication line, span measurements of the communication line, identification number of the integrated circuit, whether the adapter is coupled to the communication line via the connector, whether the writer is coupled to the integrated circuit via the adapter, number of times the communication line is coupled to the adapter via the connector, identification number of the writer, type of the connector, length of the communication line, type of the communication line, dimensions of a panel comprising the adapter, number of adapters in the panel, identification number of the panel, dimensions of a shelf comprising the panel, identification number of the shelf, number of panels in the shelf, fiber count of the communication line and number of communication lines coupled to the adapter.

* * * * *